(12) United States Patent
Ono et al.

(10) Patent No.: US 12,056,366 B2
(45) Date of Patent: Aug. 6, 2024

(54) STORAGE SYSTEM

(71) Applicant: Hitachi, Ltd., Tokyo (JP)

(72) Inventors: Taisuke Ono, Tokyo (JP); Hideo Saito, Tokyo (JP); Takaki Nakamura, Tokyo (JP); Takahiro Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 62 days.

(21) Appl. No.: 17/940,371

(22) Filed: Sep. 8, 2022

(65) Prior Publication Data

US 2023/0297241 A1  Sep. 21, 2023

(30) Foreign Application Priority Data

Mar. 16, 2022  (JP) ................ 2022-041870

(51) Int. Cl.
*G06F 3/06* (2006.01)
(52) U.S. Cl.
CPC .......... *G06F 3/0614* (2013.01); *G06F 3/0635* (2013.01); *G06F 3/0659* (2013.01); *G06F 3/067* (2013.01)
(58) Field of Classification Search
None
See application file for complete search history.

(56) References Cited

U.S. PATENT DOCUMENTS

| | | | | |
|---|---|---|---|---|
| 11,010,266 | B1* | 5/2021 | Blaszka | G06F 11/2092 |
| 2004/0225697 | A1* | 11/2004 | Asano | G06F 11/2007 |
| 2006/0075198 | A1* | 4/2006 | Susaki | G06F 3/0631 |
| | | | | 711/147 |
| 2010/0205479 | A1 | 8/2010 | Akutsu et al. | |
| 2013/0159513 | A1* | 6/2013 | Hayashi | H04L 43/0817 |
| | | | | 709/224 |
| 2014/0115277 | A1* | 4/2014 | Sakata | G06F 3/0635 |
| | | | | 711/149 |
| 2014/0331084 | A1* | 11/2014 | Sawazaki | G06F 3/061 |
| | | | | 714/6.23 |
| 2016/0139841 | A1* | 5/2016 | Agetsuma | G06F 3/067 |
| | | | | 711/162 |
| 2016/0371145 | A1 | 12/2016 | Akutsu et al. | |
| 2020/0034263 | A1* | 1/2020 | Ebara | G06F 12/0813 |

* cited by examiner

*Primary Examiner* — Nathan Sadler
(74) *Attorney, Agent, or Firm* — Volpe Koenig

(57) ABSTRACT

A volume to be accessed by a host is provided. A reliability policy related to data reliability and a performance policy related to response performance to an access to the volume are set in the volume. A node that processes redundant data of data for a node that processes the data related to the volume is determined based on the reliability policy. The determined node returns a result of an access to the volume from the host according to the performance policy.

12 Claims, 23 Drawing Sheets

FIG. 5

DATA PROTECTION SET MANAGEMENT TABLE — 312

POOL VOLUME MANAGEMENT TABLE — 510

| POOL VOLUME ID | SIZE | PARITY GROUP ID | LOGICAL DRIVE ID |
|---|---|---|---|
| 0 | 256GB | 0 | 0 |
| 1 | 341GB | 1 | 3 |
| 2 | 341GB | 2 | 6 |

511　512　513　514

PARITY GROUP MANAGEMENT TABLE — 520

| PARITY GROUP ID | REDUNDANCY POLICY | LOGICAL DRIVE ID LIST | STATE |
|---|---|---|---|
| 0 | Mirroring (3-Rep.) | 0, 1, 2 | NORMAL |
| 1 | EC(2D1P) | 3, 4, 5→16 | CHANGE |
| 2 | NO REDUNDANCY | 6 | NORMAL |
| 3 | EC(2D1P) | 5, 17, 18 | CREATE |

521　522　523　524

LOGICAL DRIVE MANAGEMENT TABLE — 530

| LOGICAL DRIVE ID | START OFFSET | SIZE | DRIVE ID |
|---|---|---|---|
| 0 | 0x00000000 | 512GB | 0 |
| 1 | 0x00000000 | 512GB | 1 |
| 2 | 0x00000000 | 512GB | 3 |

531　532　533　534

STRIPE MAPPING TABLE — 540

EC(2D1P) — 541

|  | N0 | N1 | N2 |
|---|---|---|---|
| #0 | A1 | B1 | C1 |
| #1 | C2 | A2 | B2 |
| #2 | Bp | Cp | Ap |
| #3 | D1 | E1 | F1 |
| #4 | F2 | D2 | E2 |
| #5 | Ep | Fp | Dp |
| #6 | SPARE | SPARE | SPARE |
| #7 | SPARE | SPARE | SPARE |

Mirror (3-Rep.) — 542

|  | N0 | N1 | N2 |
|---|---|---|---|
| #0 | A1 | B1 | C1 |
| #1 | Cp | Ap | Bp |
| #2 | Bp | Cp | Ap |
| #3 | D1 | E1 | F1 |
| #4 | Fp | Dp | Ep |
| #5 | Ep | Fp | Dp |
| #6 | SPARE | SPARE | SPARE |
| #7 | SPARE | SPARE | SPARE |

FIG. 6

STORAGE POOL MANAGEMENT TABLE — 313

STORAGE POOL CONFIGURATION MANAGEMENT TABLE — 610

| STORAGE POOL ID | TOTAL CAPACITY | USED CAPACITY | POOL VOLUME ID LIST | NODE ID |
|---|---|---|---|---|
| 0 | 256GB | 10GB | 0 | 0 |
| 1 | ... | ... | 1 | 1 |
| 611 | 612 | 613 | 614 | 615 |

FIG. 7

VIRTUAL VOLUME MANAGEMENT TABLE — 314, 710

VIRTUAL VOLUME MANAGEMENT TABLE

| VIRTUAL VOLUME ID | SIZE | RELIABILITY POLICY | PERFORMANCE POLICY |
|---|---|---|---|
| 0 | 200GB | REGION FAILURE RESISTANCE, TRIPLE | Middle |
| 1 | 100GB | AVAILABILITY ZONE FAILURE RESISTANCE, DUAL | Middle |
| 2 | 100GB | NO FAILURE RESISTANCE | High |

711 / 712 / 713 / 714

ARRANGEMENT NODE MANAGEMENT TABLE — 720

| VIRTUAL VOLUME ID | PRIMARY NODE ID | REDUNDANCY DESTINATION NODE ID LIST |
|---|---|---|
| 0 | 0 | 2,5 |
| 1 | 2 | 1 |
| 2 | 3 | - |

721 / 722 / 723

RESPONSE STORAGE DEVICE MANAGEMENT TABLE — 730

| NODE ID | RESPONSE STORAGE DEVICE |
|---|---|
| 0 | DRIVE |
| 2 | SCM |
| 5 | SCM |

731 / 732

PAGE MAPPING TABLE — 740

| PAGE ID | VIRTUAL VOLUME ID | VIRTUAL VOLUME LBA | SIZE | POOL VOLUME ID | POOL VOLUME LBA |
|---|---|---|---|---|---|
| 0 | 0 | 0x00000000 | 128MB | 0 | 0x000000 |
| 1 | 1 | 0x00000000 | 128MB | 1 | 0xC00000 |
| 2 | 2 | 0x06400000 | 64MB | 2 | 0x800000 |
| ... | ... | ... | ... | ... | ... |

CACHE DATA MANAGEMENT TABLE — 315

CACHE MAPPING INFORMATION TABLE — 810

| DRIVE ID | DRIVE LBA  | SIZE  | MEMORY ADDRESS |
|----------|------------|-------|----------------|
| 0        | 0x00000000 | 4KB   | 0x01000000     |
| 1        | 0x08000000 | 256KB | 0x40000000     |
| 3        | 0xA0000000 | 8KB   | 0x08000000     |

PERFORMANCE MONITOR INFORMATION MANAGEMENT TABLE — 316

PROCESSOR PERFORMANCE INFORMATION TABLE — 910

| CPU ID | CPU USAGE RATE |
|---|---|
| 0 | 50% |
| 1 | 20% |

911, 912

MEMORY PERFORMANCE INFORMATION TABLE — 920

| REMAINING MEMORY CAPACITY |
|---|
| 50GB |

921

DRIVE PERFORMANCE INFORMATION TABLE — 930

| DRIVE ID | READ IOPS | WRITE IOPS | READ BAND | WRITE BAND |
|---|---|---|---|---|
| 0 | 20M IOPS | 0M IOPS | 80MB/s | 0MB/s |
| 1 | 10M IOPS | 10M IOPS | 40MB/s | 80MB/s |
| 2 | 5M IOPS | 1M IOPS | 20MB/s | 4MB/s |
| : | : | : | : | : |

931, 932, 933, 934, 935

NETWORK PERFORMANCE INFORMATION TABLE — 940

| PORT ID | BAND | BAND USAGE RATE | RECEIVE BAND | TRANSMIT BAND |
|---|---|---|---|---|
| 0 | 10Gbps | 50% | 2Gbps | 3Gbps |
| 1 | 10Gbps | 10% | 800Mbps | 200Mbps |

941, 942, 943, 944, 945

INTER-NODE NETWORK QUALITY INFORMATION TABLE — 950

| NODE ID | DELAY TIME | RETRANSMISSION RATE |
|---|---|---|
| 1 | 0.5ms | 1% |
| 2 | 2ms | 10% |
| : | : | : |

POLICY PERFORMANCE INFORMATION MANAGEMENT TABLE ~317

POLICY PERFORMANCE INFORMATION TABLE ~2330

| POLICY ID | NODE ID | RELIABILITY POLICY | PERFORMANCE POLICY | NUMBER OF IO PROCESSING COMMANDS | RESPONSE TIME |
|---|---|---|---|---|---|
| 0 | 0 | NO FAILURE RESISTANCE | High | 70KIOPS | 0.5ms |
| 1 | 0 | NO FAILURE RESISTANCE | Middle | 50KIOPS | 1ms |
| 2 | 0 | NO FAILURE RESISTANCE | Low | 30KIOPS | 2ms |
| 3 | 0 | INTER-NODE DATA PROTECTION | Middle | 20KIOPS | 5ms |
| : | : | : | : | : | : |

2331  2332  2333  2334  2335  2336

STORAGE SYSTEM

BACKGROUND OF THE INVENTION

1. Field of the Invention

The present invention relates to a distributed storage system.

2. Description of the Related Art

Conventionally, US 2016/0371145 A and US 2010/0205479 A disclose distributed storage systems. US 2016/0371145 A discloses a technique of protecting data from a server failure by integrating local storages of a plurality of general-purpose servers (computers) connected via a network by storage control software to form one storage pool, providing a virtual volume from the storage pool, combining data stored in different servers when data is written to the virtual volume, calculating a parity, and storing the data and the parity in drives of different servers. This storage system is characterized in that a storage capacity and performance can be scaled out by adding a server.

US 2010/0205479 A discloses a technique in which a plurality of storages are connected via a network, a pair is created by a plurality of virtual volumes on the storages belonging to, for example, different data centers, and when data is written to one virtual volume, the data is also written to the other virtual volumes in the pair, so that the contents of the pair of virtual volumes are synchronized and the redundancy is increased.

SUMMARY OF THE INVENTION

In a case where the distributed storage system provides a virtual volume to a host on the basis of the technology of US 2016/0371145 A, when data is written to the virtual volume, data in the volume is written to drives of a plurality of servers, and a response is returned. Therefore, a time (response time) from when there is an IO request from the host to when the response is returned cannot be shortened as compared with a sum of a time required for writing to the drive of the server and a communication time between the servers.

Depending on the application of the host, there is a case where a shorter response time is required to use the virtual volume as a cache, and redundancy is not required, but the technology of US 2016/0371145 A has a problem that it is not possible to cope with such a use case.

In addition, when the technology of US 2010/0205479 A is applied to a storage system including a general-purpose server disclosed in US 2016/0371145 A, data redundant between servers is further made redundant with another storage system, and redundancy is performed in two stages.

Depending on the application of the host, there is a case where redundancy of the virtual volume in the same data center is not required and redundancy of the virtual volume with another data center is required, but the technologies of US 2016/0371145 A and US 2010/0205479 A have a problem that it is not possible to cope with such a use case.

Therefore, an object of the present invention is to operate a distributed storage system so that redundancy of data based on a write access from a host and responsiveness to the write access are matched with a request of the host.

In order to achieve the above object, the present means provides a storage system including: a plurality of nodes connected to each other via a network, and a storage device, each of the plurality of nodes including a processor that processes data input to and output from the storage device, and a memory, in which the processor is configured to: provide a volume to be accessed by a host; set a reliability policy related to data reliability and a performance policy related to response performance to an access to the volume in the volume; determine a node that processes redundant data of data for a node that processes the data related to the volume based on the reliability policy; determine, for each node based on the performance policy, a memory or storage device to store the data or the redundant data to return a result of an access to the volume; upon receiving a write request from the host, return a response to the host when data related to the write request is stored in a memory or a storage device determined based on the performance policy of a node that processes the data, and the redundant data is stored in the memory or the storage device determined based on the performance policy of the node that processes the redundant data.

The distributed storage system can be operated such that redundancy of data based on a write access from the host and responsiveness to the write access are matched with a request of the host.

BRIEF DESCRIPTION OF THE DRAWINGS

FIG. 5 is a diagram illustrating an example of a data protection set management table according to the first embodiment;

FIG. 6 is a diagram illustrating an example of a storage pool management table according to the first embodiment;

FIG. 7 is a diagram illustrating an example of a virtual volume management table according to the first embodiment;

FIG. 6 is a diagram illustrating an example of a cache data management table according to the first embodiment;

FIG. 9 is a diagram illustrating an example of a performance monitor information management table according to the first embodiment;

FIG. 22 is a diagram illustrating an example of a policy performance information management table according to the first embodiment.

DESCRIPTION OF THE PREFERRED EMBODIMENTS

Hereinafter, embodiments of the present invention will be described with reference to the drawings. The following description and drawings are appropriately simplified and omitted for clarity of description. In addition, not all combinations of features described in the embodiments are necessary for the solution of the invention.

In the following description, information may be described using a "table", but the information may be expressed in another data structure. The "XX table", the" XX list", and the like may be referred to as "XX information "to indicate that they do not depend on the data structure. In describing the content of each piece of information, expressions such as "identification information", "identifier", "name", "ID", and "number" are used, but these can be replaced with each other.

Figure 1:
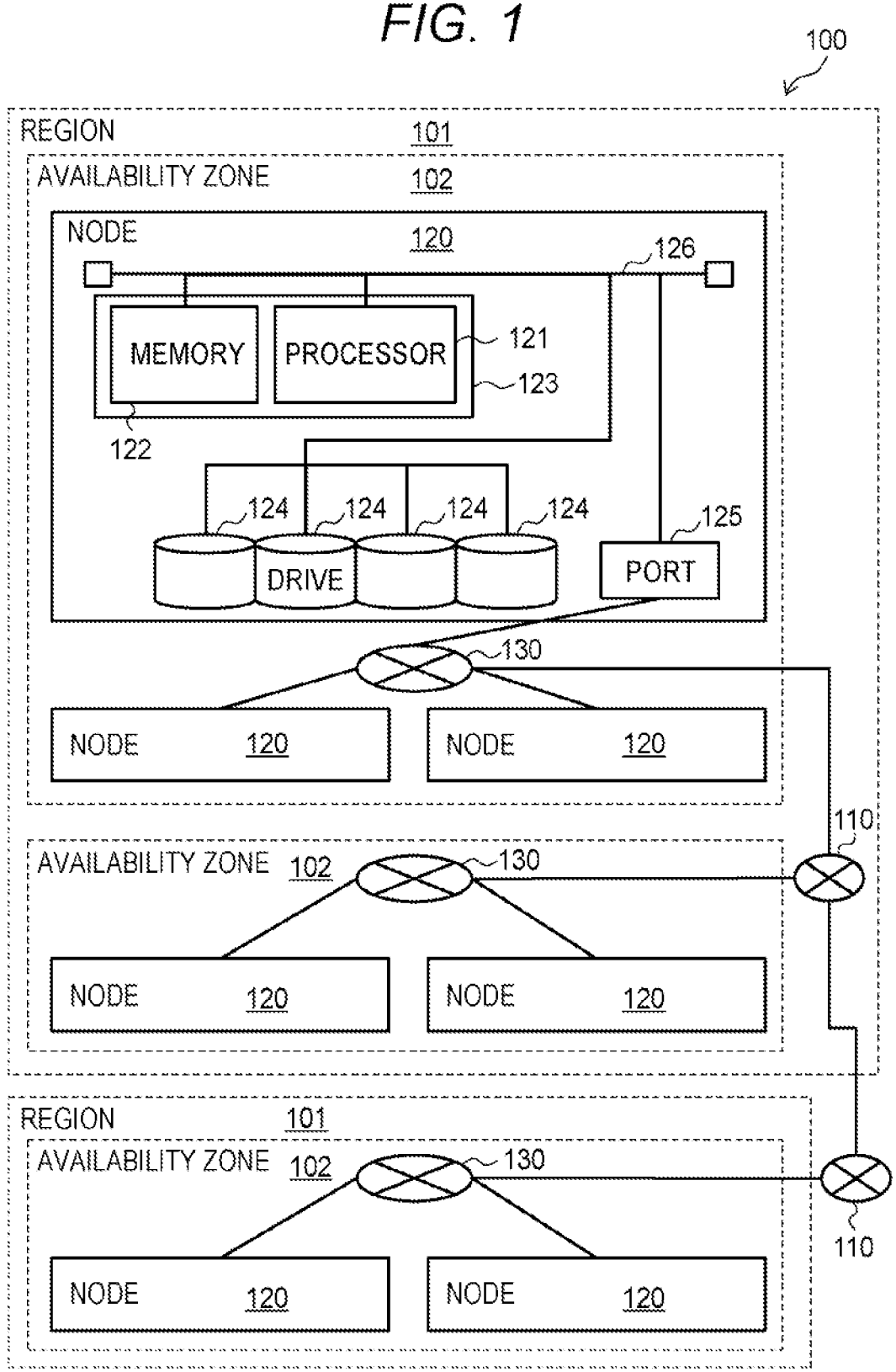
FIG. 1 is a diagram illustrating an example of a physical configuration of a storage system according to a first embodiment.

In FIG. 1, a storage system 100 according to the first embodiment is illustrated as a whole. FIG. 1 is a diagram illustrating an example of a physical configuration according to the storage system 100. One or more regions 101 may be provided in the storage system 100. The regions 101 are connected via a network 110 and can communicate with each other. The network 110 is, for example, a wide area network (WAN), but is not limited to the WAN.

The region 101 is a base or the like including a plurality of data centers, and one or more availability zones 102 may be provided. The availability zones 102 are connected via the network 110 and can communicate with each other. The network 110 is, for example, a wide area network (WAN), but is not limited to the WAN.

The availability zone 102 is a data center or the like, and includes one or more nodes 120. The node 120 may have a general computer configuration. The node 120 includes, for example, one or more processor packages 123 including a processor 121, a memory 122, and the like, one or more drives 124, and one or more ports 125. The components are connected via an internal bus 126.

The processor 121 is, for example, a central processing unit (CPU), and performs various types of processing. The memory 122 stores various types of data. The stored data is, for example, information necessary for realizing the functions of the storage system 100 and the node 120 or a program executed by the processor 121. The memory 122 may be a volatile dynamic random access memory (DRAM), a nonvolatile storage class memory (SCM), or another storage device.

The drive 124 stores various types of data and programs. The drive 124 may be a hard disk drive (HDD) or a solid state drive (SSD) connected with serial attached SCSI (SAS) or serial advanced technology attachment (SATA), or the SSD connected with a nonvolatile memory express (NVMe), or may be an SCM or the like, and is an example of a storage device.

The port 125 is connected to a network 130 and can communicate with other nodes 120 in the availability zone 102. The network 130 is, for example, a local area network (LAN), but is not limited to the LAN.

The physical configuration of the storage system 100 is not limited to the above contents. For example, the networks 110 and 130 may be redundant. In addition, for example, the network 110 may be separated into a management network and a storage network, the connection standard may be Ethernet (registered trademark), Infiniband, or wireless, and the connection topology is not limited to the configuration illustrated in FIG. 1.

Figure 2:
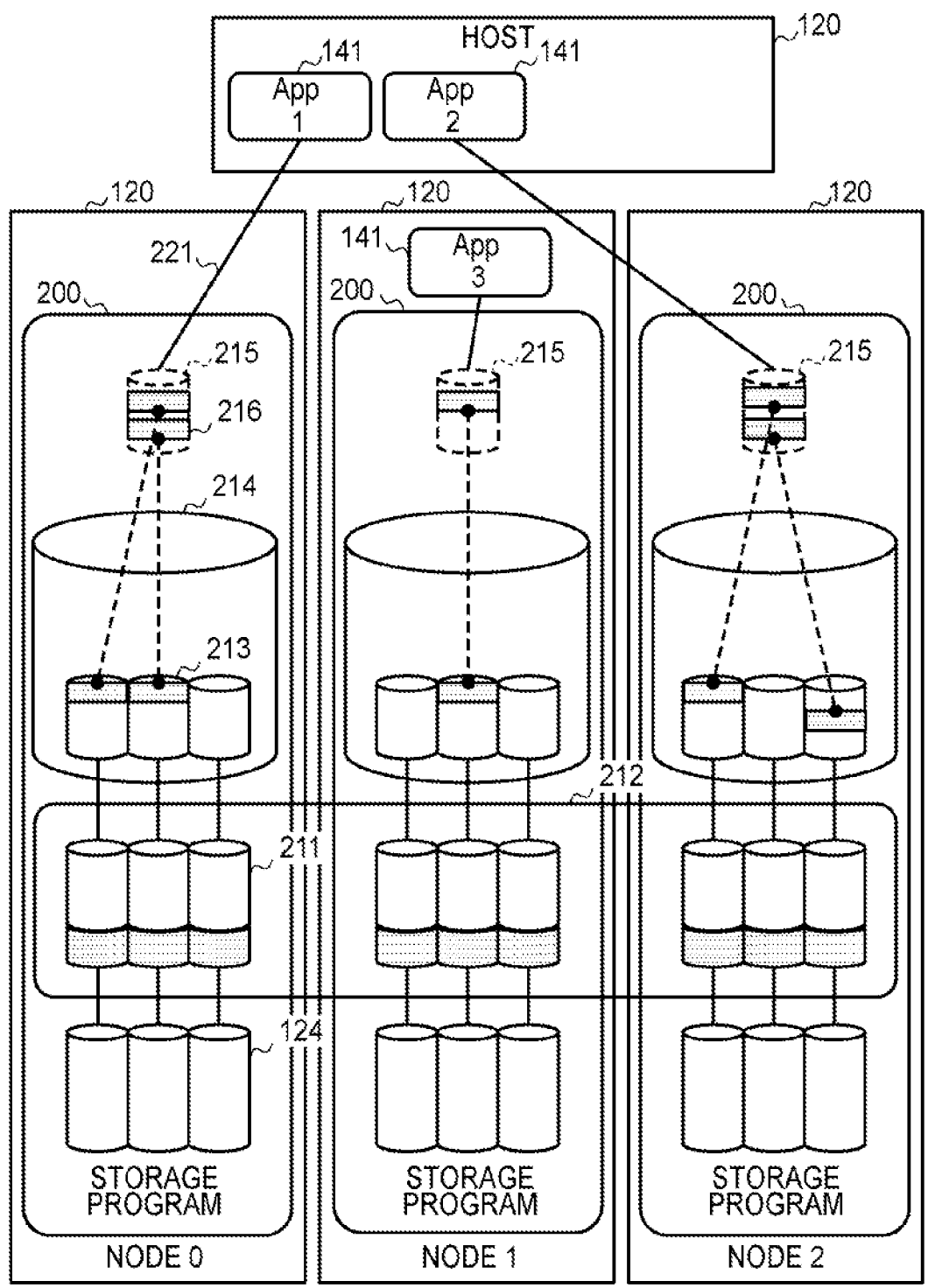
FIG. 2 is a diagram illustrating an example of a logical configuration of the storage system according to the first embodiment.

FIG. 2 is a diagram illustrating an example of a logical configuration of a storage system. In the storage system 100, physical drives of a plurality of nodes are virtually integrated to form a storage pool 214. In the storage system 100, the physical capacity is allocated only to the area used by the host node 120 using the thin provisioning function.

The drive 124 of each node has a data storage area for storing data such as write data and parity. The logical drive 211 is a continuous whole or part of a data storage area of the drive 124.

The parity group 212 is constructed by combining the logical drives 211 of the drives 124 of the plurality of nodes 120. The parity group 212 has a data protection policy. For example, when the data protection policy is 2D1P, the parity group 212 is constructed from the three logical drives 211 secured from the drives 124 of different nodes 120.

Here, as the data protection policy, for example, there is erasure coding (EC). Note that the EC includes a first scheme that does not hold data locality and a second scheme (for example, the method described in WO 2016/52665 A) that holds data locality, but any scheme is applicable to the storage system 100. In the present embodiment, a case where the second scheme is applied will be mainly described as an example.

In other words, for example, in the 2D1P EC of the first scheme, redundancy is performed by dividing the data of the write request into the first data and the second data, storing the first data in the first node 120, storing the second data in the second node 120, and storing the parity calculated by the first data and the second data in the third node 120. Furthermore, for example, in the 2D1P EC of the second scheme, redundancy is performed by dividing the data of the write request into the first data and the second data, storing the first data and the second data in the first node 120 (subject node 120), storing the parity of the first data in the second node 120, and storing the parity of the second data in the third node 120.

A pool volume 213 is extracted from the parity group 212. The pool volume 213 is a unit of allocating a capacity to the storage pool 214 of each node 120. One pool volume 213 may be extracted from one parity group 212, or a plurality of pool volumes 213 may be extracted.

In other words, for example, in a case where the data protection policy is 2D1P, what can be used as the storage area of the data is ⅔ of the total amount of the logical drives 211 allocated to the parity group 212, and what can be used as the storage area of the parity is ⅓ of the total amount of the logical drives 211 allocated to the parity group 212. That is, the maximum capacity that can be extracted as the pool volume 213 varies depending on the data protection policy.

The extracted pool volume 213 is attached to the storage pool 214. The storage pool 214 includes one or more pool volumes 213. A virtual volume 215 used by the application 141 is extracted from the storage pool 214. That is, the storage program 200 does not allocate the capacity according to the request of the user to the drive 124 but allocates the capacity as the virtual volume 215. At the time of creating the virtual volume 215, no physical area is allocated.

For example, in a case where a write request is received from the application 141, the storage program 200 allocates a page 216 (more specifically, the physical area of the logical drive 211 associated with the page 216) of the virtual volume 215 when it is a new write. Note that the page 216 is associated with a page 216 of the pool volume 213. When it is an update write, the storage program 200 specifies the physical area of the logical drive 211 associated with the allocated page 216 and updates the data. Note that the data of the write request (or intermediate data to be described later) is transferred to another node 120 related to data redundancy, and the parity is updated. The virtual volume 215 and the application 141 are connected by a front-end path 221.

In this manner, the storage program 200 manages the drive 124 as a shared storage pool 214, and allocates the capacity of the drive 124 according to the amount of data written in the virtual volume 215. As a result, waste of the capacity of the drive 124 is eliminated, and efficient operation is performed.

Hereinafter, when data is updated, a configuration (configuration to maintain data locality and eliminate network overhead at the time of read) in which the data is stored in the drive 124 (local drive) of the node 120 that has received the write request will be mainly described as an example.

Note that the application 141 that accesses data may be provided and operated in the host node 120, may be provided and operated in the same node 120 as the storage program 200, or may be provided and operated in another node 120.

Figure 3:
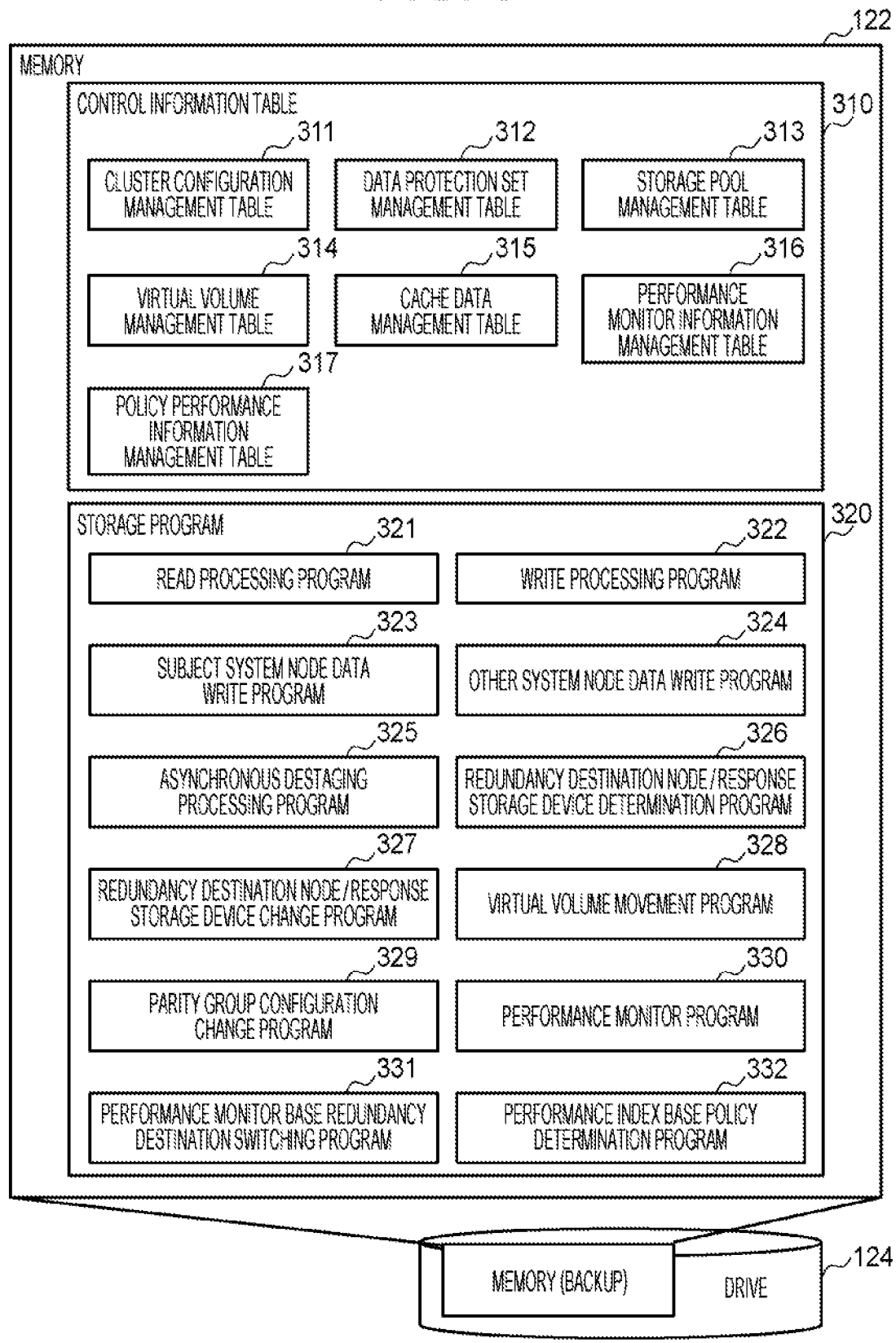
FIG. 3 is a diagram illustrating an example of information arranged on a memory according to the first embodiment.

FIG. 3 is a diagram illustrating an example of information arranged in the memory 122. In the memory 122, a control information table 310 and a storage program 320 read from the drive 124 are arranged. The control information table 310 and the storage program 320 are also stored in the nonvolatile drive 124 so as not to lose data even if power is lost at the time of power failure or the like.

The control information table 310 includes a cluster configuration management table 311, a data protection set management table 312, a storage pool management table 313, a volume management table 314, a cache data management table 315, a performance monitor information management table 316, and a policy performance information management table 317. Details of each table will be described with reference to FIGS. 4 to 9 and FIG. 22.

The storage program 320 includes a read processing program 321, a write processing program 322, a subject-system node data write program 323, an other-system node data write program 324, an asynchronous destaging processing program 325, a redundancy destination node/response storage device determination program 326, a redundancy destination node/response storage device change program 327, a volume movement program 328, a parity group configuration change program 329, a performance monitor program 330, a performance monitor base redundancy destination switching program 331, and a performance index-based policy determination program 332. Details of each program will be described with reference to FIGS. 10 to 21.

The storage program 320 and the like may be implemented by, for example, the processor 121 reading a program stored in the drive 124 into the memory 122 and executing the program (software), may be implemented by hardware such as a dedicated circuit, or may be implemented by combining software and hardware. Furthermore, some of the functions of the node 120 may be realized by another computer capable of communicating with the node 120.

Figure 4:
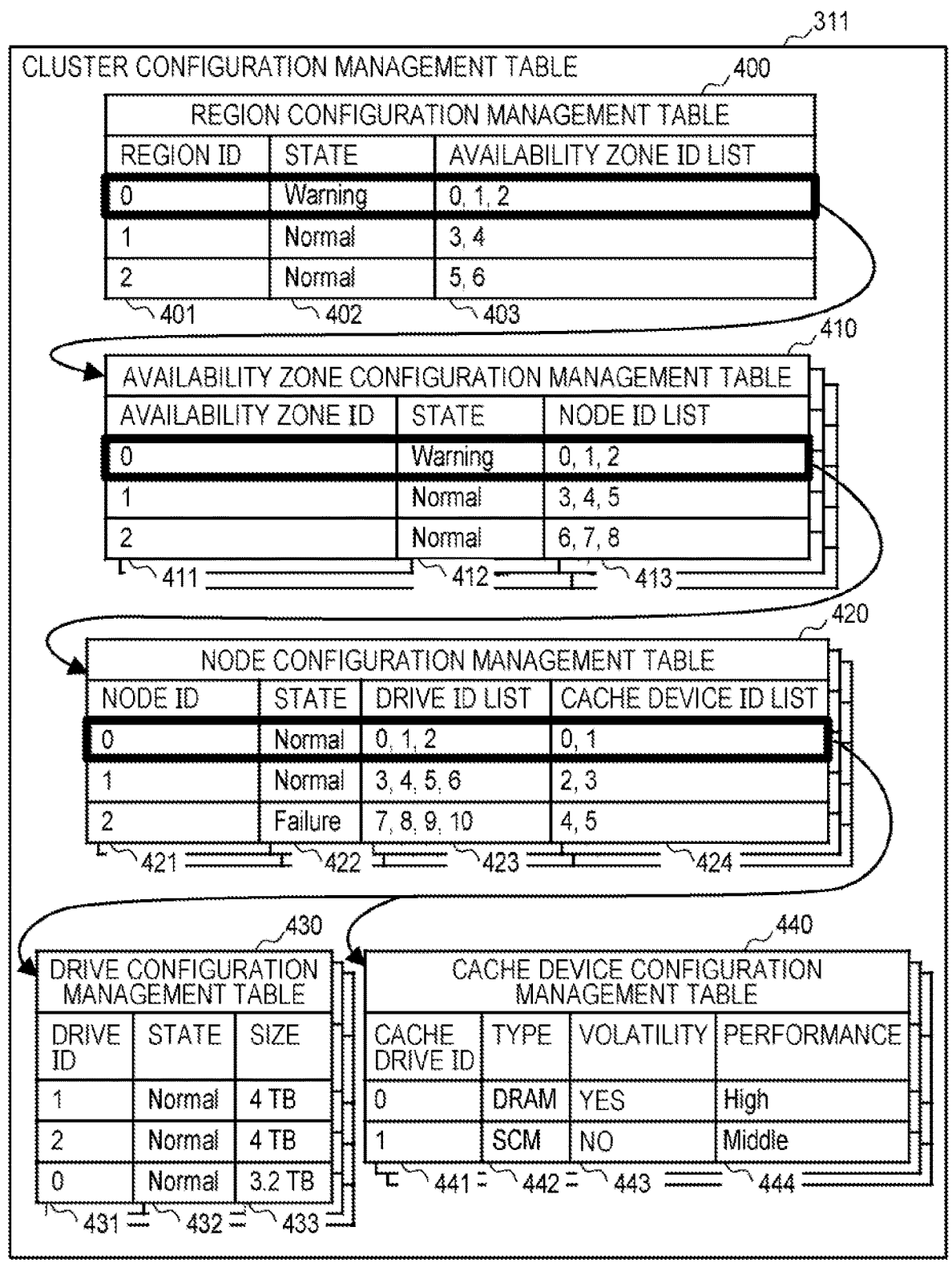
FIG. 4 is a diagram illustrating an example of a cluster configuration management table according to the first embodiment.

FIG. 4 is a diagram illustrating an example of the cluster configuration management table 311. The cluster configuration management table 311 is used to manage information of the region 101, the availability zone 102, the node 120, and the drive 124.

The cluster configuration management table 311 includes a region configuration management table 400, an availability zone management table 410, a node configuration management table 420, a drive configuration management table 430, and a cache device configuration management table.

The region configuration management table 400 manages information related to the region 101 (a relationship between the region 101 and the availability zone 102, and the like). More specifically, the region configuration management table 400 manages a region number 401, a state 402, and an availability zone number list 403 in association with each other.

The region number 401 is identification information that can identify the region 101. The state 402 indicates a state (NORMAL, WARNING, FAILURE, and the like) of the region 101. The availability zone number list 403 is a list of identification information that can identify the availability zone 102 provided in the region 101.

The availability zone configuration management table 410 is provided for each region 101 and manages information related to the availability zone 102 (a relationship between the availability zone 102 and the node 120, or the like). More specifically, the availability zone configuration management table 410 manages the availability zone number 411, the state 412, and the node number list 413 in association with each other.

The availability zone number 411 is identification information capable of identifying the availability zone 102. The state 412 indicates a state (NORMAL, WARNING, FAILURE, and the like) of the availability zone 102. The node number list 413 is a list of identification information that can identify the node 120 provided in the availability zone 102.

The node configuration management table 420 is provided for each availability zone 102 and manages information related to the node 120 (a relationship between the node 120 and the drive 124, and the like). More specifically, the node configuration management table 420 manages the node number 421, the state 422, the drive number list 423, and the cache device number list 424 in association with each other.

The node number 421 is identification information capable of identifying the node 120. The state 422 indicates a state (NORMAL, WARNING, FAILURE, and the like) of the node 120. The drive number list 423 is a list of identification information that can identify the drive 124 provided in the node 120. The cache device list 424 is identification information that is provided in the node 120 and can identify the memory 122 that can be used to temporarily store data as a cache. The drive configuration management table 430 is provided for each node 120 and manages information related to the drive 124 (capacity of the drive 124 and the like). More specifically, the drive configuration management table 430 manages the drive number 431, the state 432, and the size 433 in association with each other.

The drive number 430 is identification information that can identify the drive 124. The state 432 indicates a state of the drive 124 (NORMAL, WARNING, FAILURE, and the like). The size 433 is information indicating the capacity of the drive 124, and the unit is, for example, TB (terabyte) or GB (gigabyte).

The cache device configuration management table 440 is provided for each node 120 and manages information related to the cache device. More specifically, the cache device configuration management table 440 manages the cache device number 441, the type 442, the volatility 443, and the performance 444 in association with each other.

The cache device number 441 is identification information that can identify a device that can be used as a cache among devices provided in the node 120 as the memory 122. The type 442 indicates a type (DRAM, SCM, and the like) of the cache device. The volatility 443 indicates the presence or absence of volatility of the cache device. The performance 444 is information indicating the performance of the cache device, and is HIGH, MIDDLE, LOW, or the like. As an example of labeling the performance information 444, a cache device whose type 442 is DRAM is labeled HIGH, and a cache device whose type 442 is SCM is labeled MIDDLE.

FIG. 5 is a diagram illustrating an example of a data protection set management table. The data protection set management table 312 is used to manage the pool volume 213, the parity group 212, and the logical drive 211. The data protection set management table 312 includes a pool volume management table 510, a parity group management table 520, a logical drive management table 530, and a stripe mapping table 540.

The pool volume management table 510 manages information related to the pool volume 213 (a relationship between the pool volume 213 and the parity group 212, and the like). More specifically, the pool volume management table 510 manages a pool volume number 511, a size 512, a parity group number 513, and a logical drive number 514 in association with each other.

The pool volume number 511 is identification information that can identify the pool volume 213. The size 512 is information indicating the capacity of the pool volume 213, and the unit is, for example, TB (terabyte) or GB (gigabyte). The parity group 513 is identification information that can identify the parity group 212 to which the pool volume 213 belongs. The logical drive number 514 is identifiable identification information of the logical drive 211 to which the data storage area is allocated to the pool volume 213.

The parity group management table 520 manages information related to the parity group 212 (a relationship between the parity group 212 and the logical drive 211, and the like). More specifically, the parity group management table 520 manages the parity group number 521, the redundancy policy 522, the logical drive number list 523, and the state 524 in association with each other.

The parity group number 521 is identification information capable of identifying the parity group 212. The redundancy policy 522 is information indicating a redundancy scheme of the parity group 212. The logical drive number list 523 is a list of identification information that can identify the logical drives 211 constituting the parity group 212. The state 524 indicates information (Normal, changed, created, and the like) indicating the state of the configuration change of the parity group. For example, when the state is "normal.", the content indicated by the state indicates that the configuration of the parity group 212 is not changed.

When the state is "change", it indicates that a replacement process of removing one of the logical drives 211 configuring the parity group 212 from the same parity group and newly adding another logical drive 211 to the logical drive 211, an exclusion process of deleting one of the logical drives 211 from the same parity group, or an addition process of adding another logical drive 211 to the same parity group is performed.

In the logical drive replacement process, while data is made redundant between the logical drive 211 (taking the parity group management table 520 of FIG. 5 as an example, the logical drive #5 in the parity group #1) excluded from a certain parity group and the logical drive 211 (logical drives #3 and #4 in the example of FIG. 5) left in the parity group, parity data is generated between the logical drive 211 (the logical drive #16 in the example of FIG. 5) added to the same parity group and the logical drive 211 (logical drives #3 and #4 in the example of FIG. 5) left in the parity group, and the generated parity data is written in the spare area for changing the parity group configuration of the logical drive 211 to perform redundancy. When redundancy between the logical drive 211 to be added and the logical drive 211 to be left in the parity group is completed, the logical drive 211 to be excluded is deleted from the logical drive number list 523, and the state 514 is returned to "normal".

When the state is "create", it indicates that the parity group 212 is newly created using the logical drive 212. In this process, parity data is generated between the logical drives to be added to the newly created parity group 212, and the parity data is written in the spare area for changing the parity group configuration of the logical drive 211. When redundancy is completed between the logical drives 211 to be added, the state 514 is returned to "normal".

The logical drive management table 530 manages information related to the logical drive 211 (a relationship between the logical drive 211 and the drive 124, and the like). More specifically, the logical drive management table 530 manages a logical drive number 531, a start offset 532, a size 533, and a drive number 534 in association with each other.

The logical drive number 531 is identification information that can identify the logical drive 211. The start offset 532 indicates a start address in the drive 124 when the logical drive 211 is extracted from the drive 124. The size 533 is information indicating the capacity of the logical drive 211, and the unit is, for example, TB (terabyte) or GB (gigabit). The drive number 534 is identification information that can identify the drive 124 that allocates a region to the logical drive 211.

The stripe mapping table (SMT) 540 stores information related to the parity group 212 (information for calculating a storage destination address of data and parity). As an example, information of a mapping table 541 of erasure coding (EC) (2D1P) and a mapping table 542 of mirror (3-replication) is stored. 2D1P means that one parity is calculated by a combination of two pieces of data to protect the data.

The stripe mapping tables 541 and 542 are used to specify an LBA (Logical Block Address) in a logical drive of a parity area with respect to an LBA in a logical drive of a certain data area.

The stripe mapping tables 541 and 542 are stored in a table or array format, and hold information corresponding to a logical drive ID as an element of a horizontal axis and information corresponding to an address as an element of a vertical axis. The information on the horizontal axis may directly store the information on the node ID, or may be managed via another table that associates the ID on the horizontal axis of the mapping tables 541 and 542 with the logical drive ID. The information on the vertical axis does not need to directly store the information on the LBA, and may be managed from the LBA via another table that associates the ID on the vertical axis with the LBA, for example.

FIG. 6 is a diagram illustrating an example of the storage pool management table. The storage pool management table 313 is used to manage the storage pool 214. The storage pool management table 313 includes a storage pool configuration management table 610.

The storage pool configuration management table 610 manages information related to the storage pool 214 (a relationship between the storage pool 214 and the pool volume 213, and the like). More specifically, the storage pool configuration management table 610 manages a storage pool number 611, a total capacity 612, a used capacity 613, a pool volume 614, and a node number 615 in association with each other.

The storage pool number 611 is identification information capable of identifying the storage pool 214. The total capacity 612 is information indicating the total capacity that the storage pool 214 can allocate to the virtual volume 215, and the unit is, for example, TB (terabyte) or GB (gigabyte). The used capacity 613 is information indicating a used capacity in the storage pool 214, and the unit is, for example, TB (terabyte) or GB (gigabyte). The pool volume 614 is a list of identification information that can identify the pool volume 213 allocated to the storage pool 214. The node number 615 is identification information capable of identifying the node 120 providing the storage pool.

FIG. 7 is a diagram illustrating an example of the virtual volume management table. The virtual volume management table 314 is used to manage the virtual volume 215 and the virtual volume page 216.

The virtual volume management table 314 includes a virtual volume management table 710, an arrangement node management table 720, a response storage device management table 730, and a page mapping table 740.

The virtual volume management table 710 manages information (the capacity of the virtual volume, and the like) related to the virtual volume 215. More specifically, the virtual volume management table 710 manages a virtual volume number 711, a size 712, a reliability policy 713, and a performance policy 714 in association with each other.

The virtual volume number 711 is identification information that can identify the virtual volume 215. The size 712 is information indicating the capacity of the virtual volume 215, and the unit is, for example, TB (terabyte) or GB (gigabyte).

The reliability policy 713 indicates data reliability applied to the virtual volume 215. As the reliability policy 713, for example, "region failure resistance, triple" is set to the virtual volume 215 that is required to protect data in nodes belonging to three different regions and to be able to access data even if a failure occurs in a maximum of two nodes. In addition, for example, "availability zone failure resistance, dual" is set to the virtual volume 215 in which data is protected in nodes belonging to two different availability zones and data is required to be accessible even if a failure occurs in a maximum of one node. In addition, for example, "failure resistance unnecessary" is set to the virtual volume 215 for which data protection in a plurality of nodes is not required at all.

When the virtual volume 215 is newly created, the reliability policy 713 may cause the user of the storage system 100 to determine an arbitrary policy, and similarly, when the virtual volume 215 is newly created, a policy list that can be set by the storage program 200 may be presented and the user may select and determine an arbitrary policy. Similarly, when the virtual volume 215 is newly created, the user of the storage system 100 may input the performance index value required for the virtual volume 215, and the reliability policy 713 that can achieve this performance may be selected and determined together with the performance policy 714 to be described later.

The performance policy 714 indicates performance (HIGH, MIDDLE, LOW, and the like) required for the virtual volume 215. When the virtual volume 215 is newly created, the performance policy 714 may cause the user of the storage system 100 to determine an arbitrary policy. Similarly, when the virtual volume 215 is newly created, a policy list that can be set by the program may be presented and the user may select and determine an arbitrary policy.

The arrangement node management table 720 manages information related to the arrangement node 120 of the virtual volume 215. More specifically, the arrangement node management table 720 manages the virtual volume number 721, the primary node number 722, and the redundancy destination node number list 723 in association with each other.

The virtual volume number 721 is identification information that can identify the virtual volume 215. The primary node number 722 is identification information identifying the node 120 to which the drive 124 storing the data body of the virtual volume 215 belongs. The redundancy destination node number list 723 is a list of identifiable identification information of the node 120 to which the drive 124 storing the parity data of the virtual volume 215 belongs.

The response storage device management table 730 is provided for each virtual volume 215 and manages information related to a response storage device in each node when data and parity of the virtual volume 215 are stored in the node 120. More specifically, the response storage device management table 730 manages the node number 731 and the response storage device 732 in association with each other.

The node number 731 is identification information capable of identifying the node 120. The response storage device 732 is information indicating a storage device to which the data and parity storage destination node 120 writes the data or the parity of the virtual volume 215 and returns a response.

The page mapping table 740 manages information related to thin provisioning of the virtual volume, and stores mapping information and the like of the page 216 and the pool volume 213. More specifically, the page mapping table 740 manages a page number 741, a virtual volume number 742, a virtual volume logical block address (LBA) 743, a size 744, a pool volume number 745, and a pool volume LBA 746 in association with each other.

The page number 741 is identification information that can identify the page 216. The virtual volume number 742 is identification information that can identify the virtual volume 215 to which the page 216 belongs. The virtual volume LBA 743 is information indicating a start position of the page 216 in the virtual volume 215. The size 744 is information indicating the capacity of the page 216, and the unit is, for example, MB (megabyte) or KB (kilobyte). The pool volume number 745 is identification information that can identify the pool volume 213 corresponding to the page 216. The pool volume LBA 746 is information indicating a start position of the page 216 in the pool volume 213.

When the page 216 on the virtual volume 215 is accessed, the storage program 200 refers to the page mapping table 740 and acquires the address of the pool volume 213 corresponding to the page 216. The storage program 200 performs allocation (addition of new record indicating correspondence between page 216 and pool volume 213 to page mapping table 740) of the page 216 every time a new write to the virtual volume 215 is received.

FIG. 8 is a diagram illustrating an example of a cache data management table. The cache data management table 315 is provided for each node 120 and is used to manage data cached on the memory. The cache data management table 315 includes a cache mapping information table 810.

The cache mapping information table 810 manages mapping information of an address indicating a position of data in the drive 124 and a write position on the memory for the data cached on the memory. More specifically, the cache mapping information table 810 manages a drive number 811, a drive LBA 812, a size 813, and a memory address 814 in association with each other.

The drive number 811 is identification information that can identify the drive 124 that stores the cached data. The drive LBA 812 is information indicating the position of the cache data in the drive 124. The size 813 is information indicating the capacity of the cached data, and the unit is, for example, MB (megabyte) or KB (kilobyte). The memory address 814 is information indicating the position of the cache data in the memory 122.

FIG. 9 is a diagram illustrating an example of a performance monitor information management table. The performance monitor information management table 316 is provided for each node 120 and is used to manage performance information of each node 120.

The performance monitor information management table 316 includes a processor performance information table 910, a memory performance information table 920, a drive performance information table 930, a network performance information table 940, and an inter-node network quality information table 950.

The processor performance information table 910 manages the utilization of the processor 121 on the node 120. More specifically, the processor performance information table 910 manages the CPU number 911 and the CPU usage rate 912 in association with each other.

The CPU number 911 is identification information that can identify the processor 121 on the node 120. The CPU usage rate 912 is information indicating a usage rate of the processor 121.

The memory performance information table 920 manages the remaining capacity of memory 122 on node 120. More specifically, the memory performance information table 920 manages the remaining memory capacity 921. The remaining memory capacity 921 is managed by the remaining capacity in the memory 122 on the node 120, and the unit is, for example, GB (gigabyte).

The drive performance information table 930 manages the performance of the drive on the node 120. More specifically, the drive performance information table 930 manages a drive number 931, read IOPS (Input Output Per Second) 932, write IOPS 933, a read band 934, and a write band 935 in association with each other.

The drive number 931 is identification information that can identify the drive 124 on the node 120. The read IOPS 932 is the number of read IOs per second in the drive 124. The write IOPS 933 is the number of write IOs per second in the drive 124.

The read band 934 is a read band in the drive 124, and a unit thereof is, for example, MB/s (Mega Byte Per Second). The write band 935 is a write band in the drive 124, and a unit thereof is, for example, MB/s.

Network performance information table 940 manages the performance of ports 125 on a node. More specifically, the network performance information table 940 manages a port number 941, a band 942, a band usage rate 943, a reception band 944, and a transmission band 945 in association with each other.

The port number 941 is identification information that can identify the port 125 on the node 120. The band 942 is a band of the port 125, and a unit thereof is, for example, a giga bit per second (Gbps) or a mega bit per second (Mbps).

The band usage rate 943 is a band usage rate at the port 125. The reception band 944 is a band of reception data in the port 125, and a unit thereof is, for example, Gbps or Mbps. The transmission band 945 is a band of transmission data in the port. 125, and a unit thereof is, for example, Gbps or Mbps.

The inter-node network quality information table 950 manages the quality of the inter-node network. More specifically, the node number 951, the delay time 952, and the retransmission rate 953 are managed in association with each other.

The node number 951 is identification information capable of identifying the node 120. The delay time 952 is information indicating a network delay time between the management target node 120 of the performance monitor information management table 316 and the node 120 indicated by the node number 951. The retransmission rate 953 is information indicating a packet retransmission rate of a network between the management target node 120 of the performance monitor information management table 316 and the node 120 indicated by the node number 951.

Note that the network quality information described in the inter-node network quality information table 950 is, for example, a network delay time and a retransmission rate, but is not limited to the network delay time and the retransmission rate.

Figure 10:
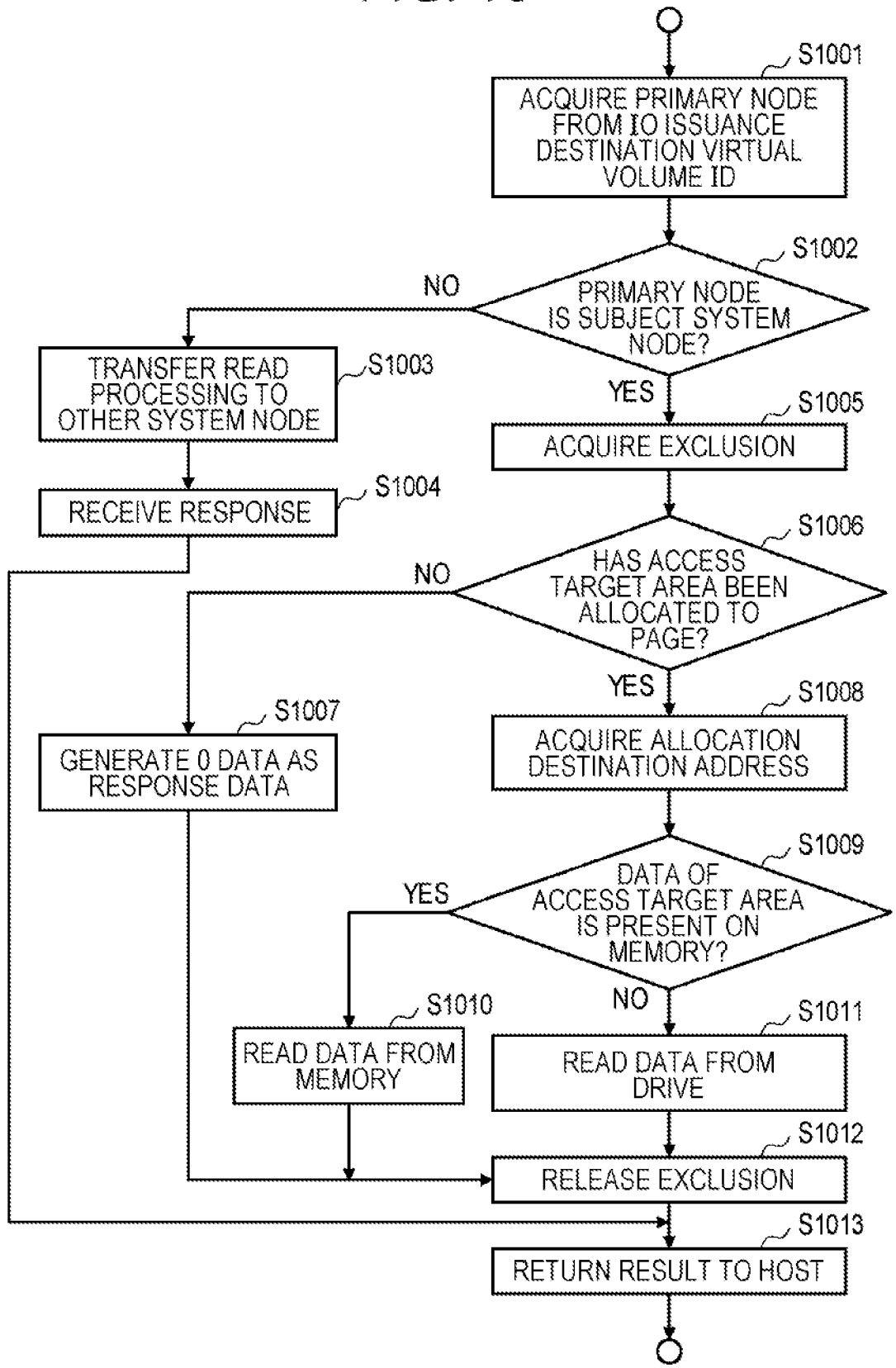
FIG. 10 is a diagram illustrating an example of a flowchart related to read processing according to the first embodiment.

FIG. 10 is a diagram illustrating an example of a flowchart related to read processing. When there is a data read processing request from the application 141, the read processing program 321 reads data from the drive 124 of the node 120. The read processing request includes identification information (Virtual volume ID such as LUN (Logical Unit Number), address such as LBA, and the like) designating a read destination. If the drive 124 storing the data is in a failed state or the node 120 is in a blocked state, the redundant data is used to repair and respond to the data. Details will be described below. In step S1001, when receiving the read processing request, the read processing program 321 refers to the arrangement node management table 720 to acquire the primary node ID of the virtual volume 215.

In step S1002, it is determined whether the primary node ID acquired in step S1001 is the subject-system node. More specifically, the primary node ID acquired in S1001 is compared with the node ID of the subject-system node, and when the ID is the same, it is determined that the subject-system node is the primary node storing the data of the virtual volume 215. When it is determined that the primary node is the subject-system node, the processing proceeds to step S1005. When it is determined that the primary node is not the subject-system node, the processing proceeds to step S1003.

In step S1003, the read processing program 321 transfers the read processing to the other-system node 120 which is the primary node of the virtual volume 215. In step S1004, the read processing program 321 waits for and receives the execution result of the read processing transferred in step S1003, and the processing proceeds to step S1013. In step S1005, the read processing program 321 acquires exclusion for the region of the read destination.

In step S1006, the read processing program 321 refers to the page mapping table 740 and determines whether the pool volume 213 is allocated to the page 216 of the virtual volume 215 of the access destination. More specifically, with reference to the page mapping table 740, it is determined whether there is a record describing correspondence between the page 216 including the read destination address of the virtual volume 215 and the address of the pool volume 213.

In a case where the read processing program 321 determines that the region of the pool volume 213 has been allocated to the page 216, the processing proceeds to step S1008. In a case where it is determined that the region of the pool volume 213 is not allocated to the page 216, the processing proceeds to step S1007.

In step S1007, the read processing program 321 generates 0 data indicating that there is no data at the read destination. In step S1008, the read processing program 321 acquires the address of the drive 124 allocated to the region of the virtual volume 215 of the read destination.

In step S1009, the read processing program 321 refers to the cache mapping table 810 and determines whether or not the data of the access destination area of the drive 124 is cached on the memory. In a case where the data exists in the memory, the processing proceeds to step S1010. In a case where the data does not exist in the memory, the processing proceeds to step S1011.

In step S1010, the read processing program 321 reads data from the memory. In step S1011, the read processing program 321 reads data from the drive 124. In step S1012, the read processing program 321 releases the mutual exclusion acquired in S1005. In step S1013, the read processing program 321 returns the result of the read processing to the host.

Figure 11:
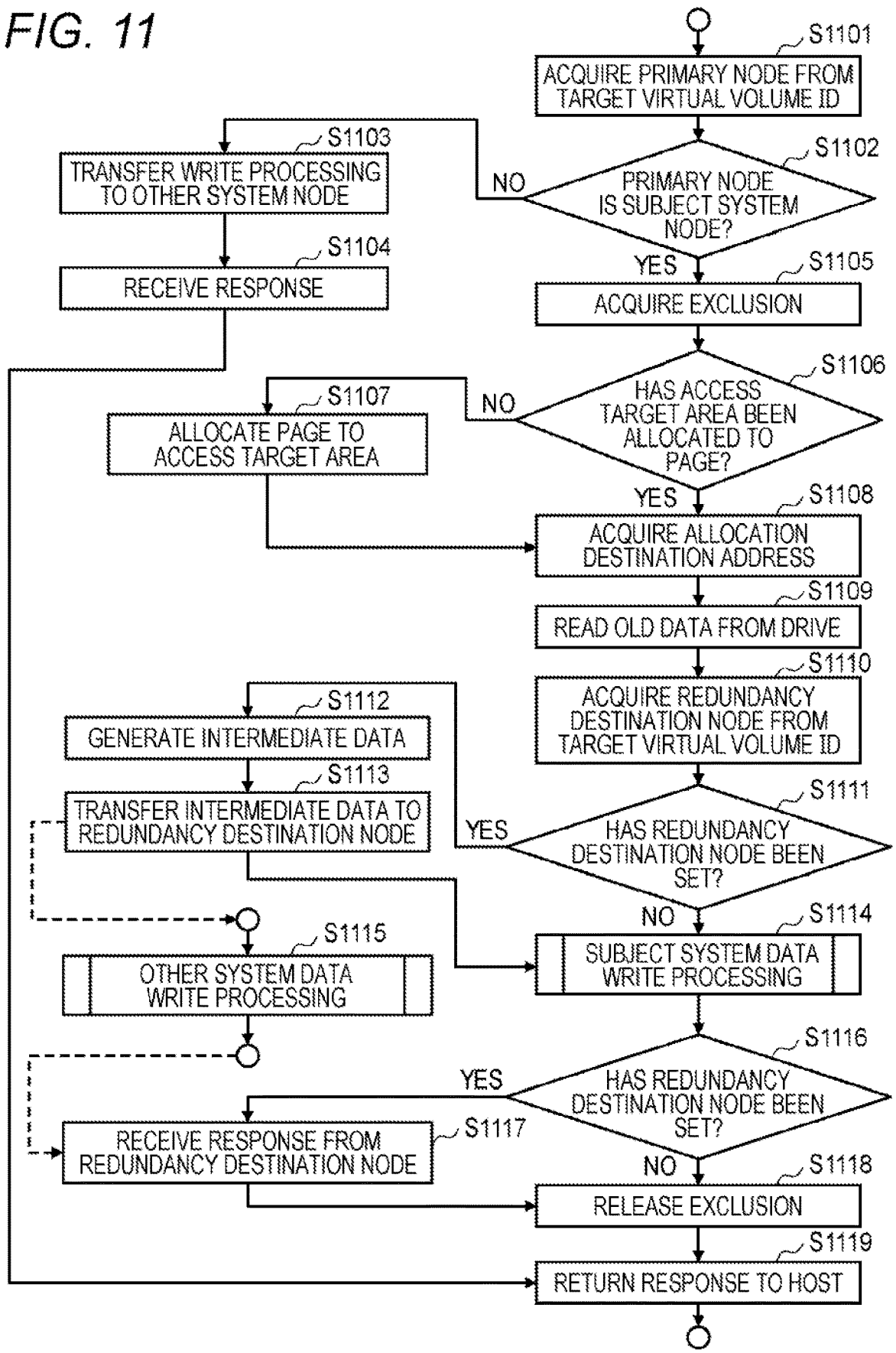
FIG. 11 is a diagram illustrating an example of a flowchart related to write processing according to the first embodiment.

FIG. 11 is a diagram illustrating an example of a flowchart related to write processing. When there is a data write processing request from the application 141, the write processing program 322 writes data to the memory 122 or the drive 124 of the node 120. The write processing request includes identification information (virtual volume ID such as LUN (Logical Unit Number), address such as LBA, and the like) designating a write destination. Details will be described below.

In step S1101, when receiving the write processing request, the write processing program 322 refers to the arrangement node management table 720 and acquires the primary node ID of the virtual volume 215.

In step S1102, it is determined whether the primary node ID acquired in step S1001 is the subject-system node. More specifically, the primary node ID acquired in S1101 is compared with the node ID of the subject-system node, and when the ID is the same, it is determined that the subject-system node is the primary node storing the data of the virtual volume 215. When it is determined that the primary node is the subject-system node, the processing proceeds to step S1105. When it is determined that the primary node is not the subject-system node, the processing proceeds to step S1103.

In step S1103, the write processing program 322 transfers the write processing to the other-system node 120 which is the primary node of the virtual volume 215. In step S1104, the write processing program 322 waits for and receives the execution result of the write processing transferred in step S1103, and the processing proceeds to step S1119.

In step S1105, the write processing program 322 acquires exclusion for the area of the write destination. In step S1106, the write processing program 322 refers to the page mapping table 740 and determines whether the pool volume 213 is allocated to the page 216 of the virtual volume 215 of the access destination. In a case where it is determined that the region of the pool volume 213 has been allocated to the page 216, the processing proceeds to step S1108. In a case where it is determined that the region of the pool volume 213 has not been allocated to the page 216, the processing proceeds to step S1107.

In step S1107, the write processing program 322 allocates a region of the pool volume 213 to the access destination page 216, and describes allocation information (number of page 216, number of virtual volume 215 in which page 216 exists, start address of page 216 in virtual volume 215, size of page 216, number of pool volume 213 to which region is allocated to page 216, start address of page 216 in pool volume 213) of the page 216 and the pool volume 213 in the page mapping table 740.

In step S1108, the write processing program 322 acquires the address of the drive 124 allocated to the region of the virtual volume 215 as the write destination.

Note that, in FIG. 11, a method of performing the processing up to step S1108 and then performing the processing after step S1109 to respond to the host when the write processing request is received will be described. However, a method of performing the processing up to step S1106 at the time when the write processing request is received, writing and caching data on the subject response storage device if the subject response storage device is the memory 122, and then returning a response to the host without performing the processing after step S1109 (including step S1109) may be used. In the latter method, the processing in and after step S1109 described in FIG. 11 is performed in the destaging processing described later.

In step S1109, the write processing program 322 reads data before writing (old data) from the drive 124. When the read destination drive 124 is in the failure state or the node 120 is in the block state, the read data is restored using the parity and the old data is read.

In step S1110, the write processing program 322 refers to the arrangement node management table 720 and acquires the redundancy destination node number list of the virtual volume 215 of the write destination.

In step S1111, the write processing program 322 determines whether there is a redundancy destination node in the virtual volume 215 of the write destination. More specifically, when one or more redundancy destination node numbers are included in the redundancy destination node number list acquired in step S1110, it is determined that there is a redundancy destination node. In a case where it is determined that there is a redundancy destination node, the processing proceeds to step S1112. In a case where it is determined that there is no redundancy destination node, the processing proceeds to step S1114.

In step S1112, the write processing program 322 calculates intermediate data from the new data received from the host and the old data read in step S1109. The intermediate data is data used in a case where the data is partially configured. More specifically, for example, in a case where the data A is divided into A1 and A2 by the old data and the parity AP is generated from A1 and A2, the intermediate data is obtained as follows.

$$A1(\text{old data}) \text{XOR } A2(\text{old data}) = AP(\text{old parity})$$

$$A1(\text{new data}) \text{XOR } A1(\text{old data}) = M(\text{intermediate data})$$

Note that the new parity is obtained as follows.

$$AP(\text{old parity}) \text{XOR } M(\text{intermediate data}) = AP(\text{new parity})$$

In step S1113, the write processing program 322 transfers the intermediate data according to the redundancy (in a case where the redundancy is 2 or more, two or more nodes 120 are connected). The node 120 that has received the intermediate data executes the process of step S1115. Note that the data to be transferred to the redundancy destination node may be the intermediate data described herein or may be a copy of a data body for which a write request has been made from the host. In a case where the data body is transferred, the intermediate data generation is unnecessary, and thus the processing of steps S1109 and S1112 is unnecessary.

In step 31114, the write processing program 322 executes a subject-system data write processing program 323 to be described later, and writes data in the subject-system memory 122 or the drive 124. In step S1115, the node 120 that has received the intermediate data executes the other-system data write processing program 324 described later to update the parity data.

In step S1116, the write processing program 322 determines whether there is a redundancy destination node in the virtual volume 215 of the write destination, similarly to step S1111. In a case where it is determined that there is a redundancy destination node, the processing proceeds to step S1117. In a case where it is determined that there is no redundancy destination node, the processing proceeds to step S1118.

In step S1117, the write processing program 322 waits for a response from the redundancy destination node for the intermediate data transferred to the other-system node 120 in S1113, receives the response, and the processing proceeds to step S1118. In step S1118, the write processing program 322 releases the exclusion acquired in S1105. In step S1119, the write processing program 322 transmits a result of the write processing to the host.

Figure 12:
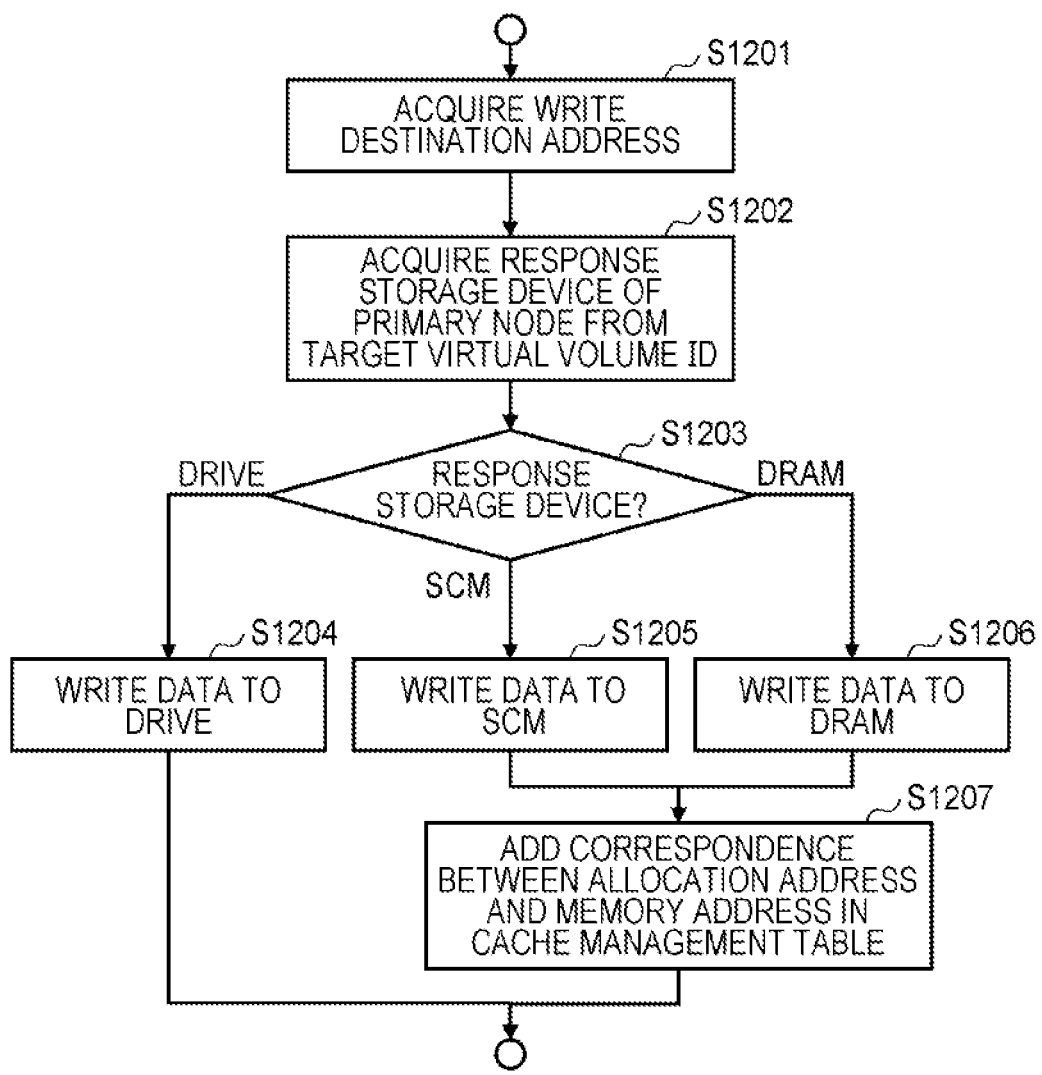
FIG. 12 is a diagram illustrating an example of a flowchart related to write processing to a storage device in a subject-system node according to the first embodiment.

FIG. 12 is a diagram illustrating an example of a flowchart related to write processing to a storage device in the subject-system node. When receiving the data to be written from the write processing program 322 and the address of the drive 124 to which the data is to be written, the subject-system data write processing program 323 writes the data in the response storage device set in the virtual volume 215. Hereinafter, a case where the node 120 includes a DRAM as a volatile memory and an SCM as a nonvolatile memory will be described in detail as an example.

In step S1201, the subject-system data write processing program 323 acquires the address of the write destination drive 124. In step S1202, the subject-system data write processing program 323 acquires the storage device to which the subject-system node writes data from the response storage device management table 730.

In step S1203, the storage device to perform writing acquired in S1202 is determined. In a case where the storage device to be written is a drive, the processing proceeds to step S1204. When the storage device is the SCM, the processing proceeds to step S1205. When the storage device is a DRAM, the processing proceeds to step S1206.

In step S1204, the subject-system data write processing program 323 writes data to the drive 124. In step S1205, the subject-system data write processing program 323 writes and caches data in the SCM in the memory 122. In step S1206, the subject-system data write processing program 323 writes and caches data in the DRAM in the memory 122.

In step S1207, the subject-system data write processing program 323 adds a record to the cache mapping information table 810, and additionally writes information (drive number, LBA in drive, size, position on memory) of the data cached on the memory in step S1205 or step S1206.

Figure 13:
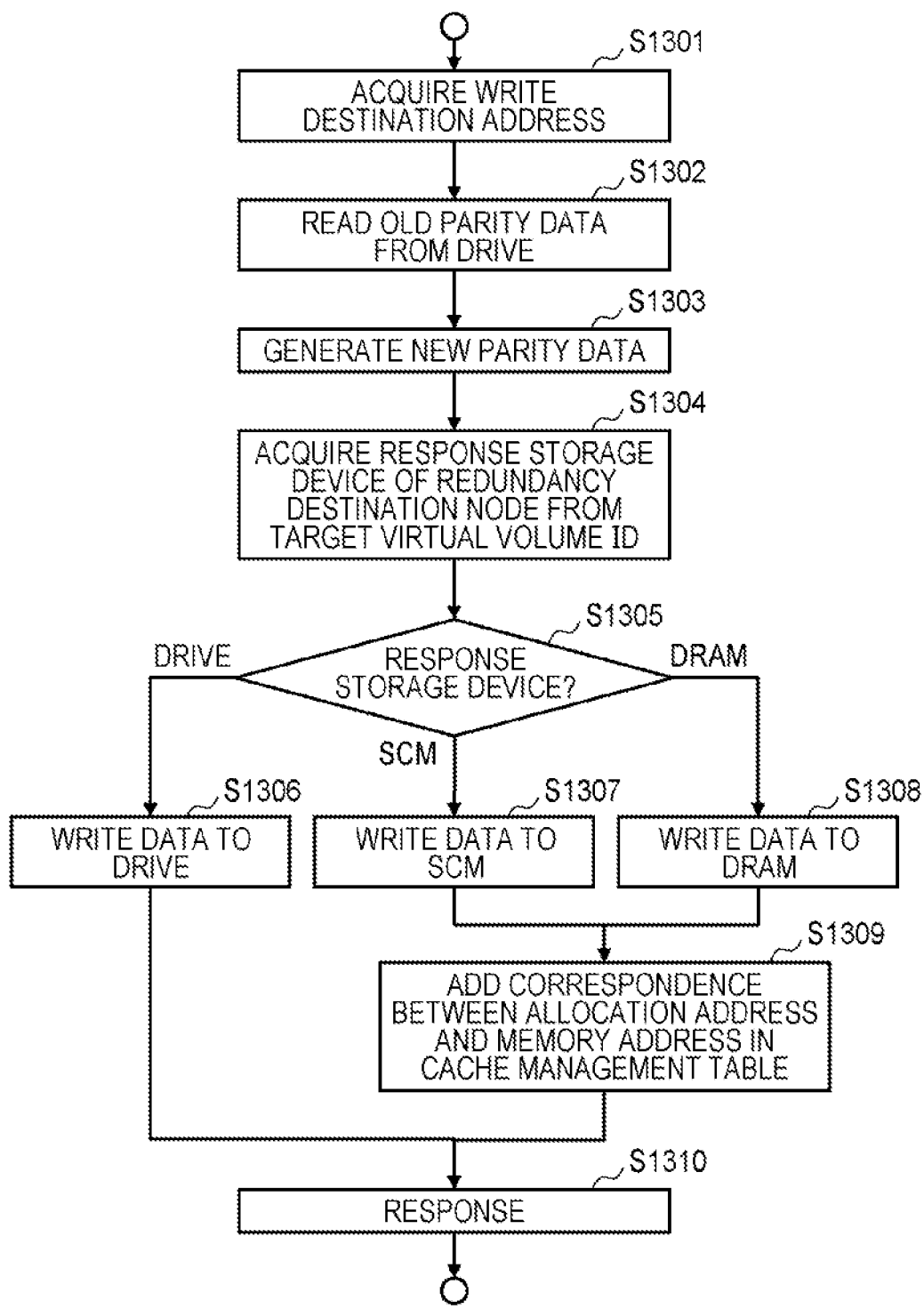
FIG. 13 is a diagram illustrating an example of a flowchart regarding write processing to a storage device in the other-system node according to the first embodiment.

FIG. 13 is a diagram illustrating an example of a flowchart related to write processing to a storage device in the other-system node. When receiving the intermediate data from the write processing program 322, the other-system data write processing program 324 writes data to the response storage device set in the virtual volume 215 and returns a response to the write processing program 322. Details will be described below.

In step S1301, the other-system data write processing program 324 acquires the address of the write destination drive 124.

In step S1302, the other-system data write processing program 324 reads data (old parity) before writing from the drive 124.

In step S1303, the other-system data write processing program 324 calculates a new parity from the received intermediate data and the old parity read in step S1302. The calculation procedure of the new parity is as described in step S1112 of FIG. 11.

Note that, in a case where not the intermediate data but the copy of the data is transferred in step S1113 of FIG. 11, the data body is written instead of the parity in the other-system node, and thus, the processing of steps S1302 and S1303 for generating the new parity is unnecessary.

In step S1304, the other-system data write processing program 324 acquires a storage device to which data is written in the redundancy destination node 120 from the response storage device management table 730.

In step S1305, the storage device to perform writing acquired in S1304 is determined. In a case where the storage device to be written is a drive, the processing proceeds to step S1306. When the storage device is the SCM, the processing proceeds to step S1307. When the storage device is a DRAM, the processing proceeds to step S1308.

In step S1306, the other-system data write processing program 324 writes data to the drive 124. In step S1307, the other-system data write processing program 324 writes and caches data in the SCM in the memory 122. In step S1308, the other-system data write processing program 324 writes and caches data in the DRAM in the memory 122.

In step S1309, the other-system data write processing program 324 adds a record to the cache mapping information table 810, and additionally writes information (drive number, LBA in drive, size, position on memory) of the data cached on the memory in step S1307 or step S1308. In step S1310, a response is returned to the write processing program 322.

Figure 14:
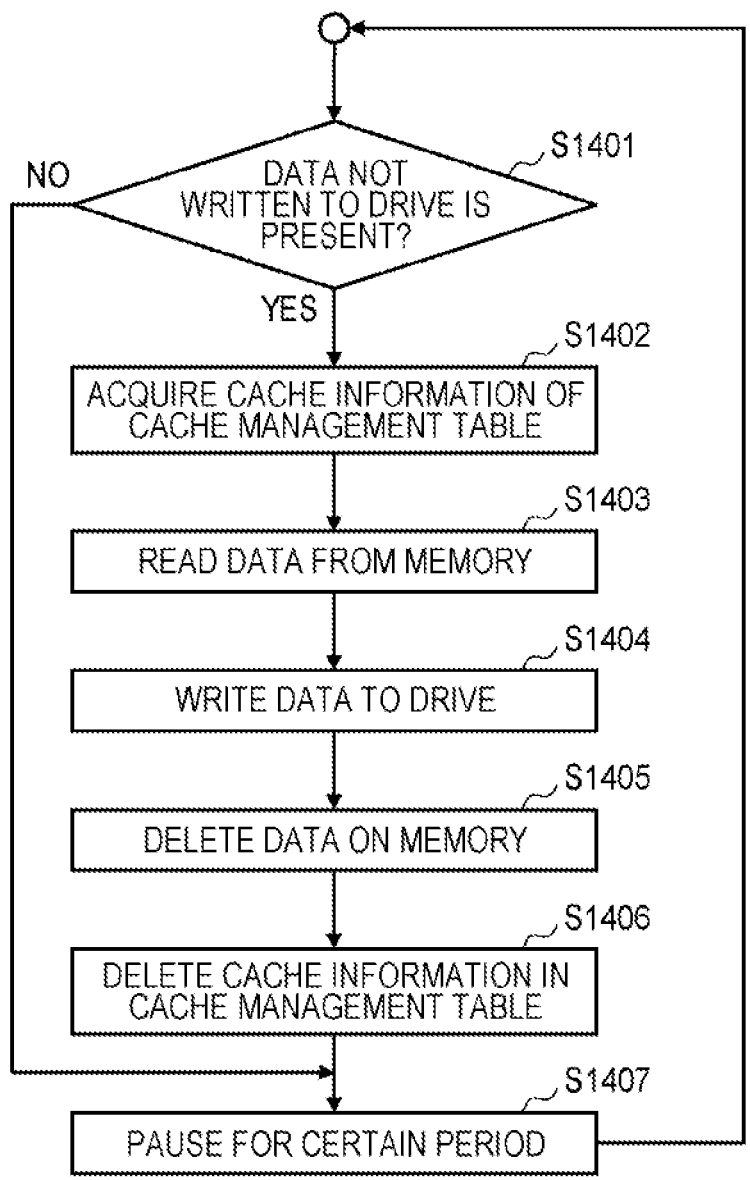
FIG. 14 is a diagram illustrating an example of a flowchart related to asynchronous destaging processing according to the first embodiment.

FIG. 14 is a diagram illustrating an example of a flowchart related to the asynchronous destaging process. The asynchronous destaging processing program 325 writes data to the memory 122 (including a volatile memory and a non-volatile memory) and writes the data not written to the drive 124 to the drive 124. Details will be described below.

In step S1401, the asynchronous destaging processing program 325 refers to the cache mapping information table 810 to determine whether the cached data exists. In a case where it is determined that there is data, the processing proceeds to step S1402. In a case where it is determined that there is no data, the processing proceeds to step S1407.

In step S1402, the asynchronous destaging processing program 325 extracts the information of the cached data for one record from the cache mapping information table 810.

In step S1403, the asynchronous destaging processing program 325 reads data from the memory address indicated in the record acquired in step S1402.

In step S1404, the asynchronous destaging processing program 325 writes the data read from the memory 122 in step S1403 to the address of the drive 124 indicated in the record acquired in step S1402.

In step S1405, the asynchronous destaging processing program 325 clears the data of the memory address indicated in the record acquired in step S1402. In step S1406, the asynchronous destaging processing program 325 deletes the record extracted in step S1402 from the cache mapping information table 810.

In step S1407, the asynchronous destaging processing program 325 is paused for a certain period. When the pause period ends, the process returns to step S1401 again to proceed with the processing.

Note that, in the write processing illustrated in FIG. 11, if the response storage device of the subject-system is the memory 122 after the processing up to step 31108 is performed at the time when the write processing request is received, data is written and cached on the device, and then in a case of adopting a method of returning a response to the host without performing the processing after step S1109, the processing from step S1109 to step S1118 is performed in the destaging processing. More specifically, after the processing from step S1401 to step S1403 is performed, the processing from step S1109 to step S1118 is performed, and then the processing from step S1405 to step 31407 is performed.

Figure 15:
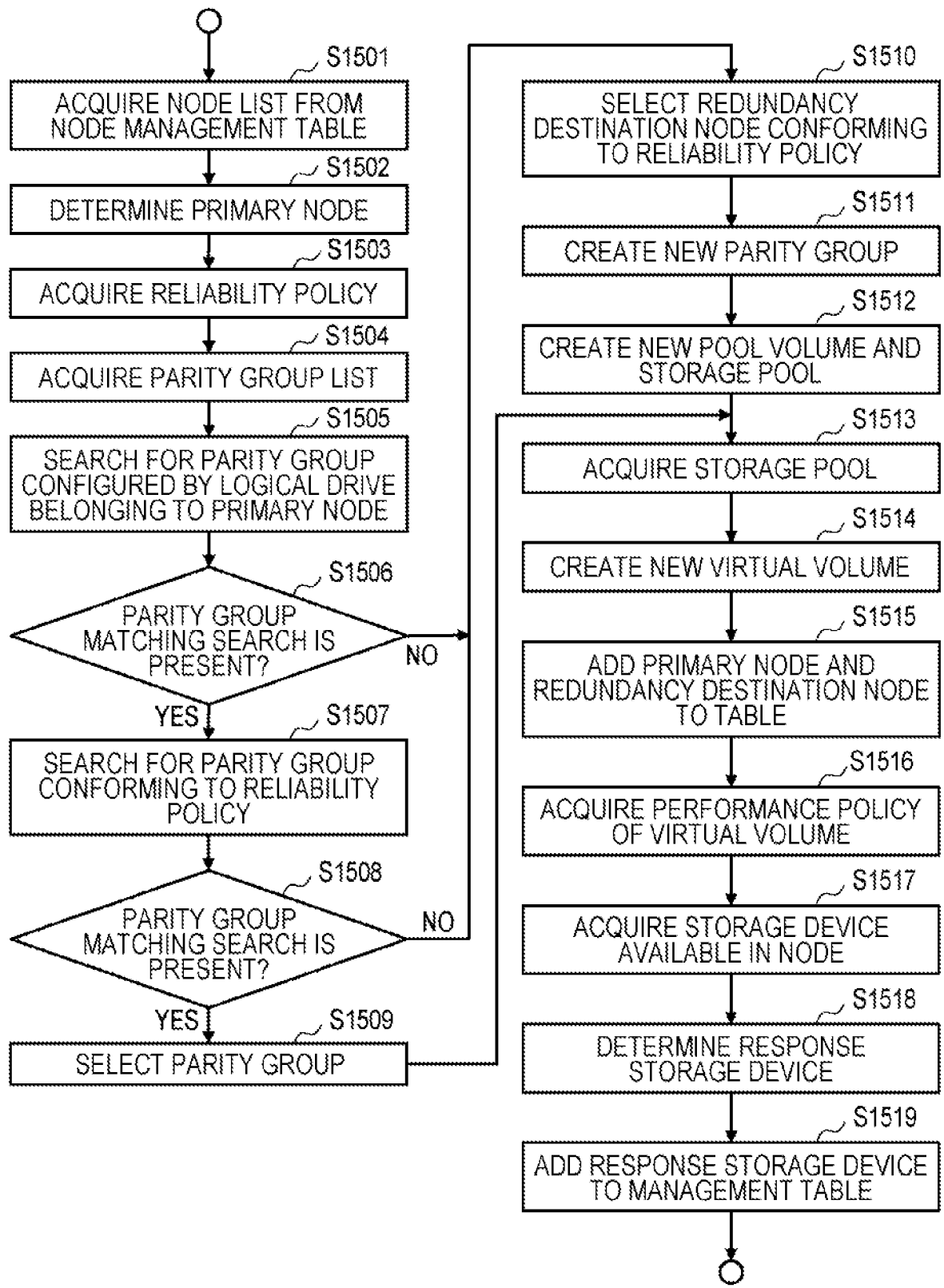
FIG. 15 is a diagram illustrating an example of a flowchart related to redundancy destination node/storage device determination processing according to the first embodiment.

FIG. 15 is a diagram illustrating an example of a flowchart related to a redundancy destination node/response storage device determination processing. The redundancy destination node/response storage device determination program 326 is called when the user of the storage system 100 performs the virtual volume creation operation, and determines which node 120 the virtual volume 215 is to be made redundant and which storage device included in the node 120 the response is to be returned to the host at the time of writing according to the reliability policy and the performance policy set in the virtual volume 215. The program is executed using the size of the virtual volume, the reliability policy, and the performance policy as arguments. Details will be described below.

In step S1501, the redundancy destination node/response storage device determination program 326 acquires a list of nodes constituting the system from the node configuration management table 420.

In step S1502, the redundancy destination node/response storage device determination program 326 determines the primary node that stores the data body of the virtual volume 215 to be newly created. A method of determining the primary node may be a method in which the number of the primary node is used as an argument of the redundancy destination node/response storage device determination program 326 and is specified at the time of execution. Alternatively, a method in which the management program presents all nodes of the system to the user of the storage system 100 and causes the user to select any node, and the program causes the user to select any node as the primary node may be used. Alternatively, a method in which the management program presents a site of the system and an availability zone and causes the user to select any site and the availability zone, and the program selects any one node from the site selected by the user and the nodes belonging to the availability zone as the primary node may be used. Alternatively, a method in which the management program acquires physical drive usage of all nodes and selects a node having the lowest physical drive usage as the primary node, or other methods may be used.

In step S1503, the redundancy destination node/response storage device determination program 326 acquires the reliability policy set for the virtual volume. In step S1504, the redundancy destination node/response storage device determination program 326 refers to the parity group management table 520 and acquires a list of the parity groups 212.

In step S1505, the redundancy destination node/response storage device determination program 326 refers to the logical drive management table 530 and acquires the logical drives 211 constituting each parity group 212 acquired in step S1504. Further, the node 120 to which the logical drive 211 belongs is acquired with reference to the node configuration management table 420. From these pieces of information, the parity group 212 configured by the logical drive 211 belonging to the primary node is searched for.

In step S1506, the redundancy destination node/response storage device determination program 326 determines the presence or absence of the parity group 212 matching the search in step S1505. In a case where there is the parity group 212 matching the search in step S1505, the processing proceeds to step S1507. In a case where there is no parity group 212 matching the search in step S1505, the processing proceeds to step S1510.

In step S1507, the redundancy destination node/response storage device determination program 326 searches for the parity group 212 having a configuration conforming to the reliability policy among the parity groups 212 configured by the logical drives 211 of the primary node detected in step S1505. For example, if the reliability policy of the virtual volume is "region failure resistance, triple", the redundancy destination node/response storage device determination program 326 searches for parity group (s) 212 consisting of devices from multiple nodes 120 in different regions, and in which data can be accessed even if a failure occurs in at most two nodes. If the reliability policy is "availability zone failure resistance, dual", the redundancy destination node/response storage device determination program 326 searches for parity group(s) 212 consisting of devices from multiple nodes 120 in different availability zones, and in which data can be accessed even if a failure occurs in at most one node.

In step S1508, the redundancy destination node/response storage device determination program 326 determines the presence or absence of the parity group 212 matching the search in step S1507. In a case where there is the parity group 212 matching the search in step S1507, the processing proceeds to step S1509. In a case where there is no parity group 212 matching the search in step S1507, the processing proceeds to step S1510.

In step S1509, the redundancy destination node/response storage device determination program 326 selects one parity group 212 from the parity groups 212 matching the search in step S1507. The method in which the plurality of parity groups 212 match the search and one parity group is selected from among the parity groups in step S1507 may be, for example, a method in which the management program calculates the average usage rate of the drives 124 constituting the parity group 212 from the monitor information and selects the parity group 212 having the lowest average usage rate. Alternatively, a method in which a parity group list is presented to the user of the storage system 100 and the user selects one of the parity groups, or another method may be used.

In step S1510, the redundancy destination node/response storage device determination program 326 selects a redundancy destination node (Two or more nodes 120 in a case where the redundancy is two or more) according to the redundancy set in the reliability policy. As a method of selecting the redundancy destination node 120, for example, if the reliability policy of the virtual volume is "region failure resistance, triple", two or more nodes 120 belonging to regions different from the primary node are selected. If the reliability policy of the virtual volume is "availability zone failure resistance, dual", one or more nodes 120 belonging to an availability zone different from the primary node are selected.

As a method of selecting one node from the candidates of the plurality of nodes 120 as the redundancy destination node, for example, the program may present a candidate list of the redundancy destination node to the user of the storage system 100, cause the user to select one node, and determine the selected node 120 as the redundancy destination node. Alternatively, the management program may obtain the physical drive usage rate of the candidate node 120 from the monitor information, and determine the node 120 having the lowest physical drive usage rate as the redundancy destination node, or another method may be used.

In step S1.511, the redundancy destination node/response storage device determination program 326 newly creates the logical drive 211 on the primary node determined in step 1502 and the redundancy destination node selected in step S1510. As the physical drive 124 to be allocated to the logical drive, a physical drive having the lowest usage rate in the node 120 may be selected, or may be selected by another method. Further, the parity group new creation processing program 329 creates a parity group consisting of newly created logical devices above, and adds a record to the parity group management table 520, numbers and describes the newly created parity group 212, and describes a redundancy policy of the parity group 212, a logical drive (newly created logical drive 211) configuring the parity group 212, and a state. The state describes contents (for example, "normal") indicating that the parity group 212 is not in the changed state.

In step S1512, the redundancy destination node response storage device determination program 326 creates the pool volume 213 configured by the parity group 212 created in step S1511, and further creates the storage pool 214 configured by the created pool volume 213.

In step S1513, the redundancy destination node response storage device determination program 326 acquires the storage pool 214 configured by the parity group 212 selected in step S1509 or the storage pool. 214 created in step S1512.

In step S1514, the redundancy destination node response storage device determination program 326 creates the virtual volume 215 on the storage pool 214 acquired in step S1513.

In step S1515, the redundancy destination node/response storage device determination program 326 adds a record to the virtual volume management table 710, assigns a number to the virtual volume created in step S1514 and describes the size designated by the argument, the reliability policy designated by the argument, and the performance policy designated by the argument. In addition, a new record is added to the arrangement node management table 720, and the number assigned to the virtual volume created in step S1514, the number of the primary node, and the number of the redundancy destination node are added.

In step S1516, the redundancy destination node/response storage device determination program 326 acquires the performance policy of the virtual volume. In step S1517, the redundancy destination node/response storage device determination program 326 refers to the arrangement node management table 720 and the cache device number list 420, and acquires the storage devices available in the primary node and the redundancy destination node of the virtual volume.

In step S1518, the redundancy destination node/response storage device determination program 326 determines a response storage device when a write request is made to the virtual volume in the primary node and the redundancy destination node according to the reliability policy and the performance policy of the virtual volume 215. In the determination method, for example, when the reliability policy is set to failure resistance required, the response destination is determined from the nonvolatile storage device. In the node in which the SCM can be used as the nonvolatile memory, the SCM is selected when the performance policy is set to HIGH, and the drive is selected when the performance policy is set to MIDDLE or LOW. Further, for example, when the reliability policy is set not to require failure resistance, DRAM can also be used as a volatile memory, and when the performance policy is HIGH, DRAM is selected. Note that the method of determining the response storage device is not limited to these methods.

In step S1519, the redundancy destination node/response storage device determination program 326 adds the record of the primary node and the redundancy destination node to the response storage device management table 730 and describes the response storage device selected in step S1518.

Figure 16:
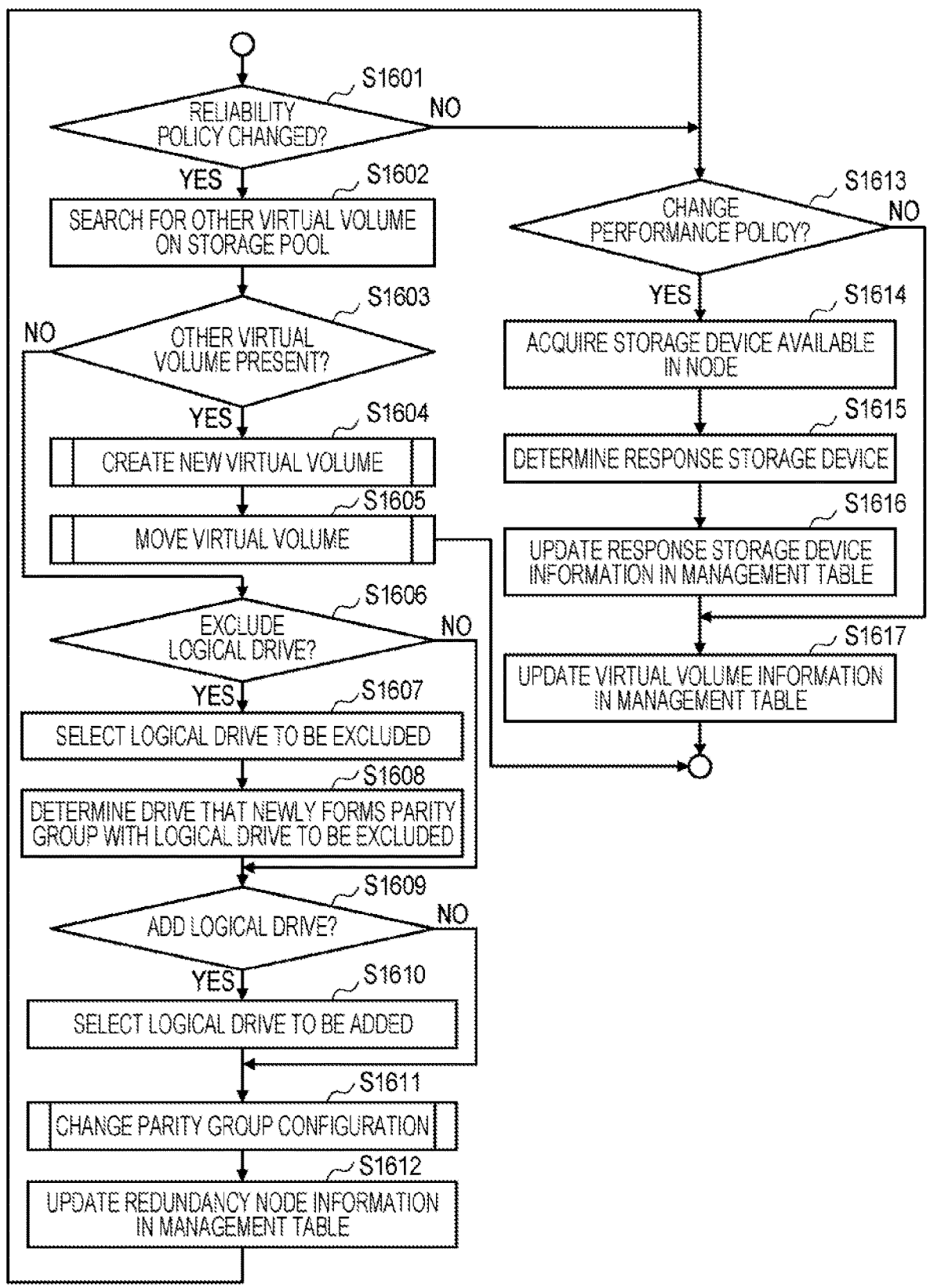
FIG. 16 is a diagram illustrating an example of a flowchart related to redundancy destination node/storage device change processing according to the first embodiment.

FIG. 16 is a diagram illustrating an example of a flowchart related to a redundancy destination node/response storage device change processing. The redundancy destination node/response storage device change program 327 is executed when the user of the storage system 100 changes the policy of the virtual volume, and changes which node 120 the virtual volume 215 is made redundant and which storage device included in the node 120 the response is returned to the host at the time of writing according to the reliability policy and the performance policy set for the virtual volume 215. The present program executes the number of the virtual volume 215 of the policy change target, the reliability policies before and after the change, and the performance policies before and after the change as arguments. Details will be described below.

In step S1601, the redundancy destination node/response storage device change program 327 determines whether there is a change in the reliability policy. When it is determined that there is a change in the reliability policy, the processing proceeds to step S1602. When it is determined that there is no change in the reliability policy, the processing proceeds to step S1613.

In step S1602, the redundancy destination node response storage device change program 327 refers to the virtual volume management table 710 and the page mapping table 740, and searches for another virtual volume 215 existing on the storage pool 214 to which the virtual volume 215 of the policy change target belongs.

In step S1603, the redundancy destination node/response storage device change program 327 determines the presence or absence of the virtual volume 215 searched in step S1602. In a case where it is determined that there is a virtual volume 215 other than the policy change target on the storage pool 214, the processing proceeds to step S1604. In a case where it is determined that there is no virtual volume 215 other than the policy change target on the storage pool 214, the processing proceeds to step S1604.

In step S1604, the redundancy destination node/response storage device change program 327 passes the reliability policy and the performance policy set for the virtual volume 215 to be subjected to the policy change to the redundancy destination node/response storage device determination program 326, and executes the program to create the virtual volume 215.

In step S1605, the redundant destination node/response storage device change program 327 passes the number of the virtual volume 215 to be subjected to the policy change and the number of the virtual volume 215 created in step S1605 to the virtual volume movement program 328, executes the program, and replaces the virtual volume 215 to be subjected to the policy change with the virtual volume 215 created in step S1605. Thereafter, the program ends.

In step S1606, the redundancy destination node/response storage device change program 327 compares the reliability policy before the change with the reliability policy after the change, and determines whether or not it is necessary to exclude the logical drive 211 in the parity group 212 to which the virtual volume 215 to be subjected to the policy change belongs by the policy change. In a case where it is determined that it is necessary to exclude the logical drive 211, the processing proceeds to step S1607. In a case where it is determined that it is not necessary to exclude the logical drive 211, the processing proceeds to step S1609.

In step S1607, the redundancy destination node/response storage device change program 327 selects the logical drive 211 existing in the redundancy destination node as a logical drive to be excluded from the logical drives 211 constituting the parity group 212 to which the virtual volume 215 of the policy change target belongs. As an example of the drive to be excluded, when the reliability policy before the change is "availability zone failure resistance, dual" and the reliability policy after the change is "region failure resistance, dual", the logical drive 211 belonging to the node of another availability zone of the redundancy destination is to be excluded.

In step S1608, after excluding the logical drive 211 selected in step S1607, the redundancy destination node/response storage device change program 327 determines a logical drive that newly forms a parity group with the logical drive 211 in order to make the data of the logical drive 211 redundant. The logical drive 211 in which the logical drive newly forms a parity group and the redundancy scheme are determined based on the reliability policy of the virtual volume 215 stored in the logical drive 211.

In step S1609, the redundancy destination node/response storage device change program 327 compares the reliability policy before the change with the reliability policy after the change, and determines whether it is necessary to add the logical drive 211 in the parity group 212 to which the virtual volume 215 of the policy change target belongs by the policy change. In a case where it is determined that it is necessary to add the logical drive 211, the processing proceeds to step S1610. In a case where it is determined that it is not necessary to add the logical drive 211, the processing proceeds to step S1611.

In step S1610, the redundancy destination node/response storage device change program 327 selects the logical drive 211 to be added to the parity group 212 to which the virtual volume 215 of the policy change target belongs. As an example of the drive to be added, in a case where the reliability policy before the change is "availability zone failure resistance, dual" and the reliability policy after the change is "region failure resistance, dual", the logical drive 211 belonging to a node existing in a region different from the region to which the primary node belongs is to be added.

In step S1611, the redundancy destination node/response storage device change program 327 executes the parity group configuration change program 329 to change the configuration of the parity group 212 to which the virtual volume 215 of the policy change target belongs. At this time, the number of the parity group to which the virtual volume 215 to be subjected to the policy change belongs, the list of the numbers of the logical drives 211 to be added selected in step S1610, the list of the numbers of the logical drives 211 to be excluded selected in step S1607, the list of the numbers of the logical drives 211 to be newly combined with the logical drives 211 to be excluded selected in step S1608, and the redundancy scheme of the parity group newly combined by the logical drives 211 to be excluded are used as arguments of the parity group configuration change program 329.

In step S1612, the redundancy destination node/response storage device change program 327 deletes the node to which the logical drive 211 excluded in step S1607 belongs from the redundancy destination node number list in the virtual volume 215 of the policy change target in the arrangement node management table 720, and additionally writes the node to which the logical drive 211 of the addition target belongs in step S1610.

In step S1613, the redundancy destination node/response storage device change program 327 determines whether there is a change in the performance policy. When it is determined that there is a change in the performance policy, the process proceeds to step S1614. When it is determined that there is no change in the reliability policy, the processing proceeds to step S1617.

In step S1614, the redundancy destination node/response storage device change program 327 refers to the arrangement node management table 720 and the cache device number list 420, and acquires the primary node of the virtual volume 215 to be subjected to the policy change and the storage device available in the redundancy destination node.

In step S1615, the redundancy destination node/response storage device change program 327 determines a response storage device when a write request is made to the virtual volume in the primary node and the redundancy destination node according to the reliability policy and the performance policy of the virtual volume 215 of the policy change target. The method of determining the response storage device is similar to that in step S1518.

In step S1616, the redundancy destination node/response storage device change program 327 describes the response storage device selected in step S1615 in the response storage device management table 730.

In step S1617, the redundancy destination node/response storage device change program 327 rewrites the reliability policy and the performance policy in the virtual volume 710 as the policy change target on the virtual volume 215 to the changed content by the redundancy destination node/response storage device change program 327.

Figure 17:
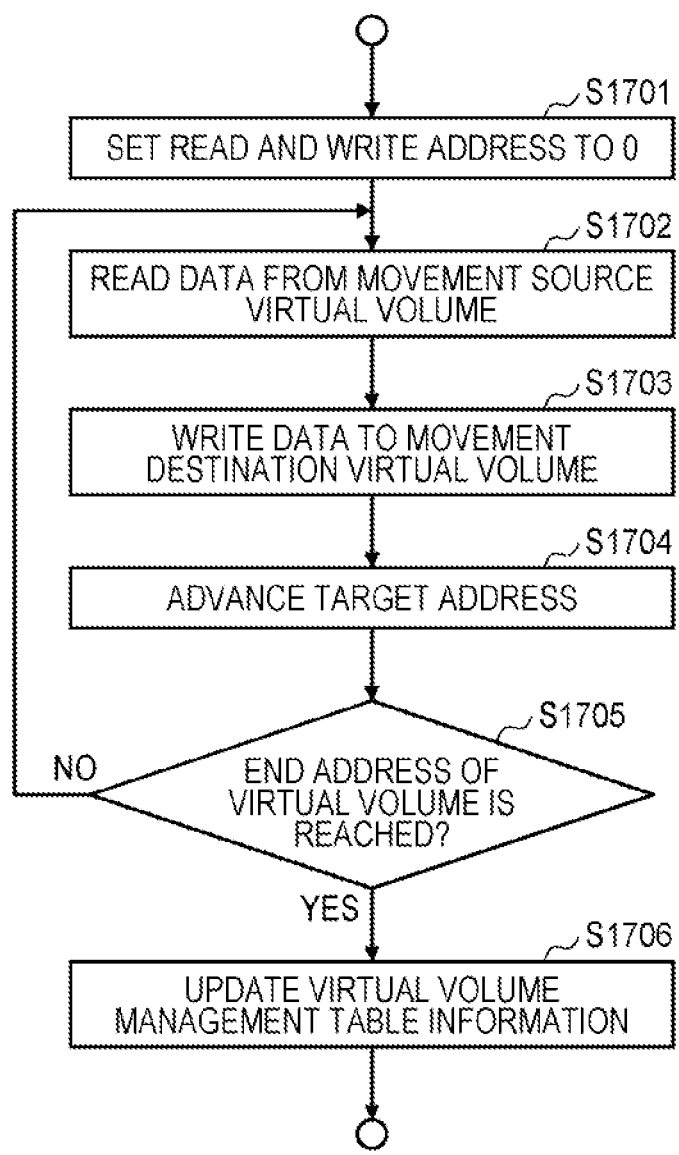
FIG. 17 is a diagram illustrating an example of a flowchart related to virtual volume movement processing according to the first embodiment.

FIG. 17 is a diagram illustrating an example of a flowchart related to the virtual volume movement processing. The virtual volume movement program 328 copies the data of the virtual volume 215 of the movement source to the movement destination virtual volume 215, and rewrites the identification of the virtual volume 215 of the movement destination to the number of the movement source virtual volume 215, thereby moving the virtual volume 215. The program is executed by taking the number of the movement source virtual volume 215 and the number of the movement destination virtual volume 215 as arguments. Details will be described below.

In step S1701, the virtual volume movement program 328 sets the read position address of the movement source virtual volume 215 and the write position address of the movement destination virtual volume 215 to 0.

In step S1702, the virtual volume movement program 328 reads data at a continuous position from the read position address of the movement source virtual volume 215. The size of the data is, for example, 1 MB.

In step S1703, the virtual volume movement program 328 writes the data read in step S1702 to the write position address of the movement destination virtual volume 215.

In step S1704, the virtual volume movement program 328 advances the read position address and the write position address by the size of the data read in step S1702.

In step S1705, the virtual volume movement program 328 determines whether the read position address reaches the end of the movement source virtual volume 215. In a case where it is determined that the read position address has reached the end of the movement source virtual volume 215, the processing proceeds to step S1706. In a case where it is determined that the read position address has not reached the end of the movement source virtual volume 215, the processing proceeds to step S1702 again.

In step S1706, the virtual volume movement program 328 rewrites the number of the movement destination virtual volume 215 on the virtual volume management table 314 to the number of the movement source virtual volume 215. The movement source virtual volume 215 is deleted.

Figure 18:
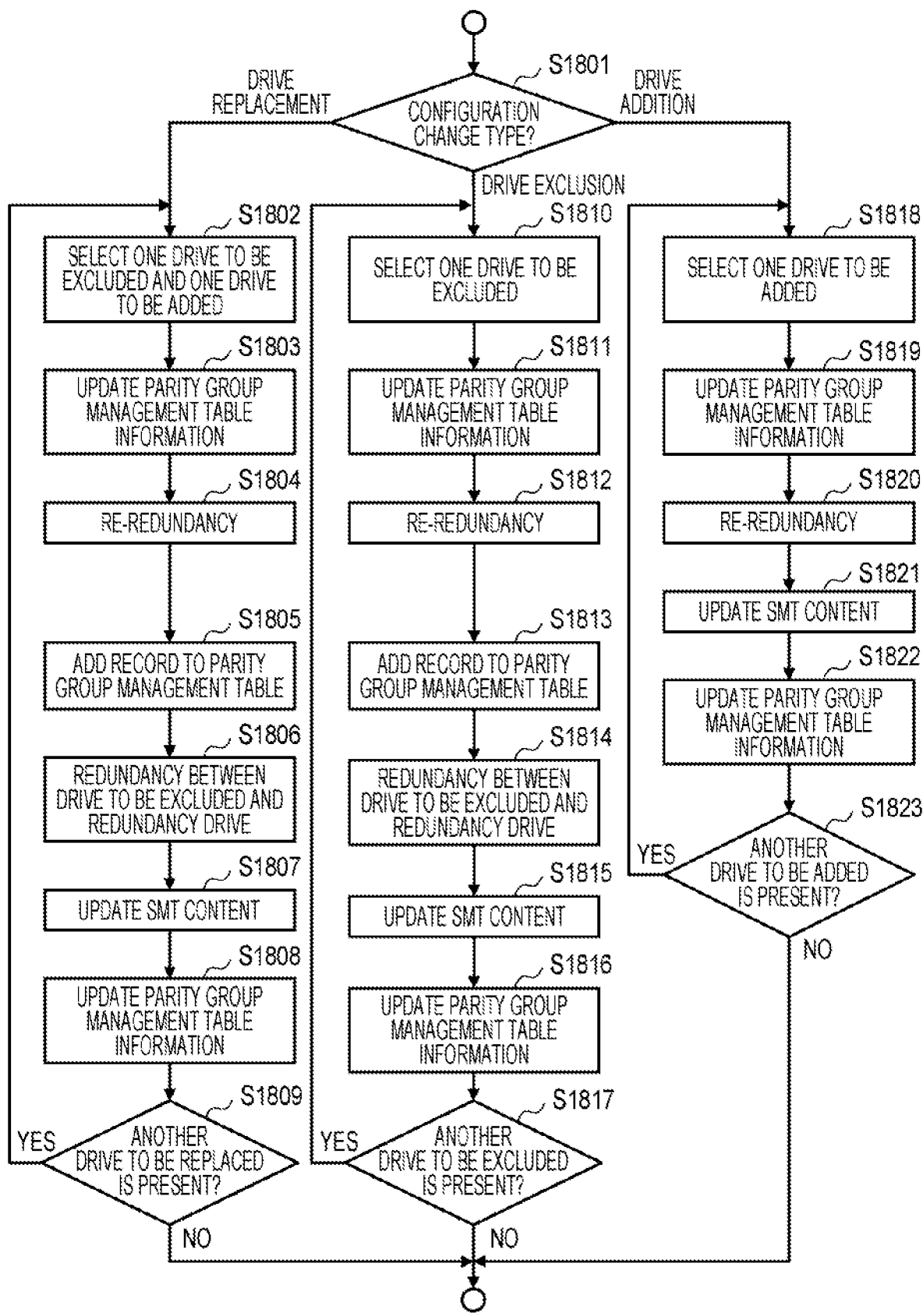
FIG. 18 is a diagram illustrating an example of a flowchart related to parity group configuration change processing according to the first embodiment.

FIG. 18 is a diagram illustrating an example of a flowchart related to parity group configuration change processing. The parity group configuration change processing program 329 adds and deletes the redundancy scheme of the parity group and the drive configuring the parity group. The program executes the number of the parity group 212 (hereinafter, the parity group) to be reconfigured, the number list (hereinafter, the additional logical drive number list) of the logical drive 211 to be added to the parity group, the number list (hereinafter, the excluded logical drive number list) of the logical drive 211 to be excluded from the parity group, the number list of the logical drive 211 newly combining the parity group with each logical drive 211 to be excluded, and the redundancy scheme of the parity group newly combined with the logical drive 211 to be excluded as arguments. Details will be described below.

In step S1801, the parity group configuration change processing program 329 determines the type of change to be made to the parity group 212. In a case where the logical drive 211 is included in both the additional logical drive number list and the excluded logical drive number list of the argument and it is determined that the change performed on the parity group 212 is the logical drive replacement, the process proceeds to step S1802. In a case where the excluded logical drive number list includes the logical drive 211, but the additional logical drive number list does not include the logical drive 211, and it is determined that the change to be made to the parity group 212 is excluded from the logical drive, the processing proceeds to step S1810. In a case where the additional logical drive number list includes the logical drive 211, but the excluded logical drive number list does not include the logical drive 211, and it is determined that the change to be performed on the parity group 212 is addition of the logical drive, the processing proceeds to step S1818.

In step S1802, the parity group configuration change processing program 329 selects one logical drive (hereinafter, the additional logical drive) to be newly added to the parity group from the additional logical drive number list of the argument, and selects one logical drive (hereinafter, the excluded logical drive) to be excluded from the parity group from the excluded logical drive number list also included in the argument.

In step S1803, the parity group configuration change processing program 329 rewrites the state to the content indicating the configuration change (for example, "change") in the information of the parity group in the parity group management table 520, and describes the content indicating that the process of replacing the excluded logical drive with the additional logical drive is being performed in the logical drive number list.

In step S1804, the parity group configuration change processing program 329 makes data redundant between the logical drive excluding the excluded logical drive among the logical drives constituting the parity group and the additional logical drive. The parity data is written in a spare area provided in the logical drive 211 with reference to the stripe mapping table (SMT).

In step S1805, the parity group configuration change processing program 329 creates a new parity group in order to continuously protect the data of the excluded logical drive, adds a record to the parity group management table 520, describes the newly assigned number, describes the redundancy scheme designated by the argument in the redundancy policy, describes the number of the excluded logical drive and the number of the logical drive newly combining the parity group with the excluded logical drive in the logical drive number list, and describes contents (for example, "create") indicating that the parity group is in the creation processing state in the state.

In step S1806, the parity group configuration change processing program 329 makes the data redundant by the redundancy scheme designated by the argument between the excluded logical drive and the logical drive newly combining the parity group with the excluded logical drive. The parity data is written in a spare area provided in the logical drive with reference to SMT.

In step S1807, the parity group configuration change processing program 329 updates the SMT of the parity group and the SMT of the parity group newly created in step S1805, and overwrites the area of the parity data of the parity group before the change with the parity data in the changed parity group written in the spare area.

In step S1808, the parity group configuration change processing program 329 rewrites the state to the contents (for example, "normal.") indicating that the configuration change has not been performed in the information of the parity group in the parity group management table 520, deletes the number of the excluded logical drive from the logical drive number list, and adds the number of the additional logical drive. In addition, the parity group configuration change processing program 329 rewrites the content (for example, "normal") indicating that the configuration change has not been performed in the information on the parity group created in step S1805 in the parity group management table 520.

In step S1809, the parity group configuration change processing program 329 refers to the additional logical drive number list and the excluded logical drive number list, and determines whether the logical drive 211 to be subjected to the replacement processing still exists. In a case where it is determined that there is still the logical drive 211 to be subjected to the replacement processing, the processing proceeds to step S1802. When it is determined that there is no logical drive 211 to be subjected to the replacement processing (all the replacement processing of the logical drive 211 has been completed), the program is terminated.

In step 31810, the parity group configuration change processing program 329 selects one logical drive (hereinafter, excluded logical drive) to be excluded from the parity group from the excluded logical drive number list included in the argument.

In step S1811, the parity group configuration change processing program 329 rewrites (for example, "changes") the state to the content indicating the configuration change in the information on the parity group in the parity group management table 520, and describes the content indicating that the exclusion processing of the excluded logical drive is being performed in the logical drive number list.

In step S1812, the parity group configuration change processing program 329 makes data redundant among the logical drives excluding the excluded logical drive among the logical drives constituting the parity group. The parity data is written in a spare area provided in the logical drive 211 with reference to SMT.

In step S1813, the parity group configuration change processing program 329 creates a new parity group in order to continuously protect the data of the excluded logical drive, adds a record to the parity group management table 520, describes the newly assigned number, describes the redundancy scheme designated by the argument in the redundancy policy, describes the number of the excluded logical drive and the number of the logical drive newly combining the parity group with the excluded logical drive in the logical drive number list, and describes contents (for example, "create") indicating that the parity group is in the creation processing state in the state.

In step S1814, the parity group configuration change processing program 329 makes the data redundant by the redundancy scheme designated by the argument between the excluded logical drive and the logical drive newly combining the parity group with the excluded logical drive. The parity data is written in a spare area provided in the logical drive with reference to SMT.

In step S1815, the parity group configuration change processing program 329 updates the SMT of the parity group and the SMT of the parity group newly created in step S1813, and overwrites the area of the parity data of the parity group before the change with the parity data in the changed parity group written in the spare area.

In step S1816, the parity group configuration change processing program 329 rewrites the state to the contents (for example, "normal") indicating that the configuration change has not been performed in the information of the parity group in the parity group management table 520, and deletes the number of the excluded logical drive from the logical drive number list. In addition, the parity group configuration change processing program 329 rewrites the content (for example, "normal") indicating that the configuration change has not been performed in the information on the parity group created in step S1813 in the parity group management table 520.

In step S1817, the parity group configuration change processing program 329 refers to the excluded logical drive number list and determines whether the logical drive 211 to be excluded is still present. In a case where it is determined that there is still the logical drive 211 to be subjected to the exclusion process, the process proceeds to step S1810. When it is determined that there is no logical drive 211 to be subjected to the exclusion process (all the exclusion processes of the logical drive 211 are completed), the program is terminated.

In step S1818, the parity group configuration change processing program 329 selects one logical drive (hereinafter, the additional logical drive) to be newly added to the parity group of the configuration change target from the additional logical drive number list included in the argument.

In step S1819, the parity group configuration change processing program 329 rewrites the state to the content indicating the configuration change (for example, "change") in the information of the parity group in the parity group management table 520, and describes the content indicating that the process of adding the additional logical drive is being performed in the logical drive number list.

In step S1820, the parity group configuration change processing program 329 makes data redundant between the logical drive constituting the parity group and the additional logical drive. The parity data is written in a spare area provided in the logical drive 211 with reference to SMT.

In step S1821, the parity group configuration change processing program 329 updates the SMT of the parity group, and overwrites the parity data in the changed parity group written in the spare area with the area of the parity data of the parity group before the change.

In step S1822, the parity group configuration change processing program 329 rewrites the state to the contents (for example, "normal") indicating that the configuration change has not been performed in the information of the parity group in the parity group management table 520, and adds the number of the additional logical drive to the logical drive number list.

In step S1823, the parity group configuration change processing program 329 refers to the additional logical drive number list and determines whether the logical drive 211 to be subjected to the addition processing still exists. In a case where it is determined that the logical drive 211 to be subjected to the additional processing still exists, the processing proceeds to step S1818. In a case where it is determined that there is no logical drive 211 to be subjected to the addition process (all the addition processes of the logical drive 211 have been completed), the program is terminated.

Figure 19:
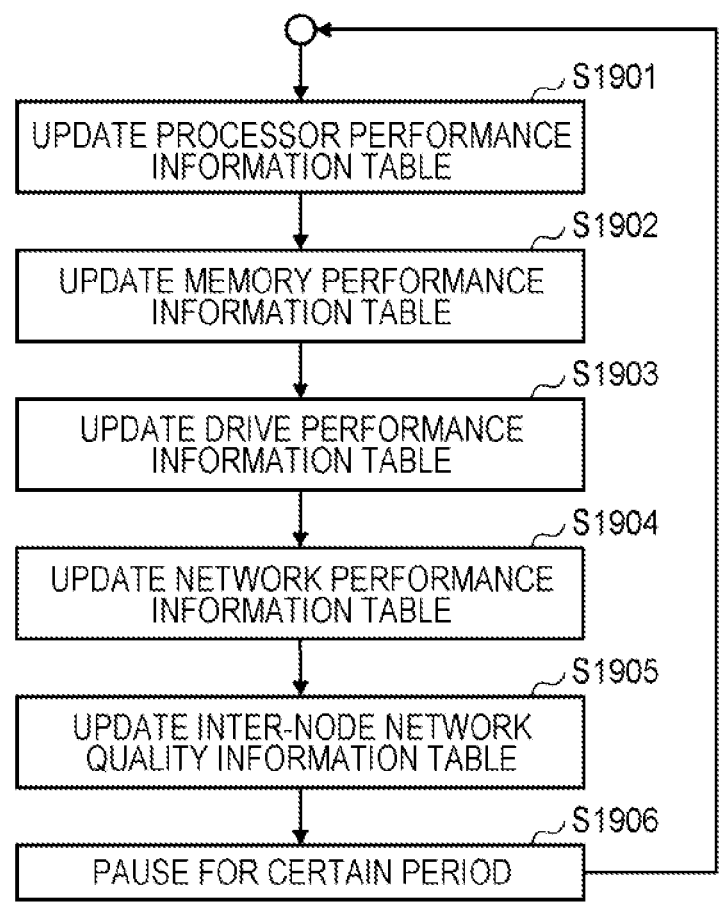
FIG. 19 is a diagram illustrating an example of a flowchart related to performance monitor processing according to the first embodiment.

FIG. 19 is a diagram illustrating an example of a flowchart related to performance monitor processing. The performance monitor processing program 330 acquires various pieces of performance information from the node 120 and updates the performance monitor information management table 316. Details will be described below.

In step S1901, the performance monitor processing program 330 acquires the usage rate of the processor 121 belonging to the node 120, and describes the usage rate for each processor number in the processor performance information table 910.

In step S1902, the performance monitor processing program 330 acquires the remaining capacity of the memory 122 of the node 120 and describes the remaining capacity in the memory performance information table 920.

In step S1903, the performance monitor processing program 330 collects read IOPS, write IOPS, a read band, and a write band of the drive belonging to the node 120, and describes the read IOPS, write IOPS, the read band, and the write band for each drive number in the drive performance information table 930.

In step S1904, the performance monitor processing program 330 acquires the reception band and the transmission band of the NIC belonging to the node 120, and describes the band usage rate calculated from the reception band, the transmission band, and the maximum band, the reception band, and the transmission band for each port number in the network performance information table 940.

In step S1905, the performance monitor processing program 330 acquires the delay time and the retransmission rate of the network between the node 120 and the other nodes 120, and describes the delay time and the retransmission rate for each node number in the inter-node network quality information table.

In step S1906, the performance monitor processing program 330 pauses for a certain period. When the pause period ends, the process returns to step S1901 again to proceed with the processing.

Figure 20:
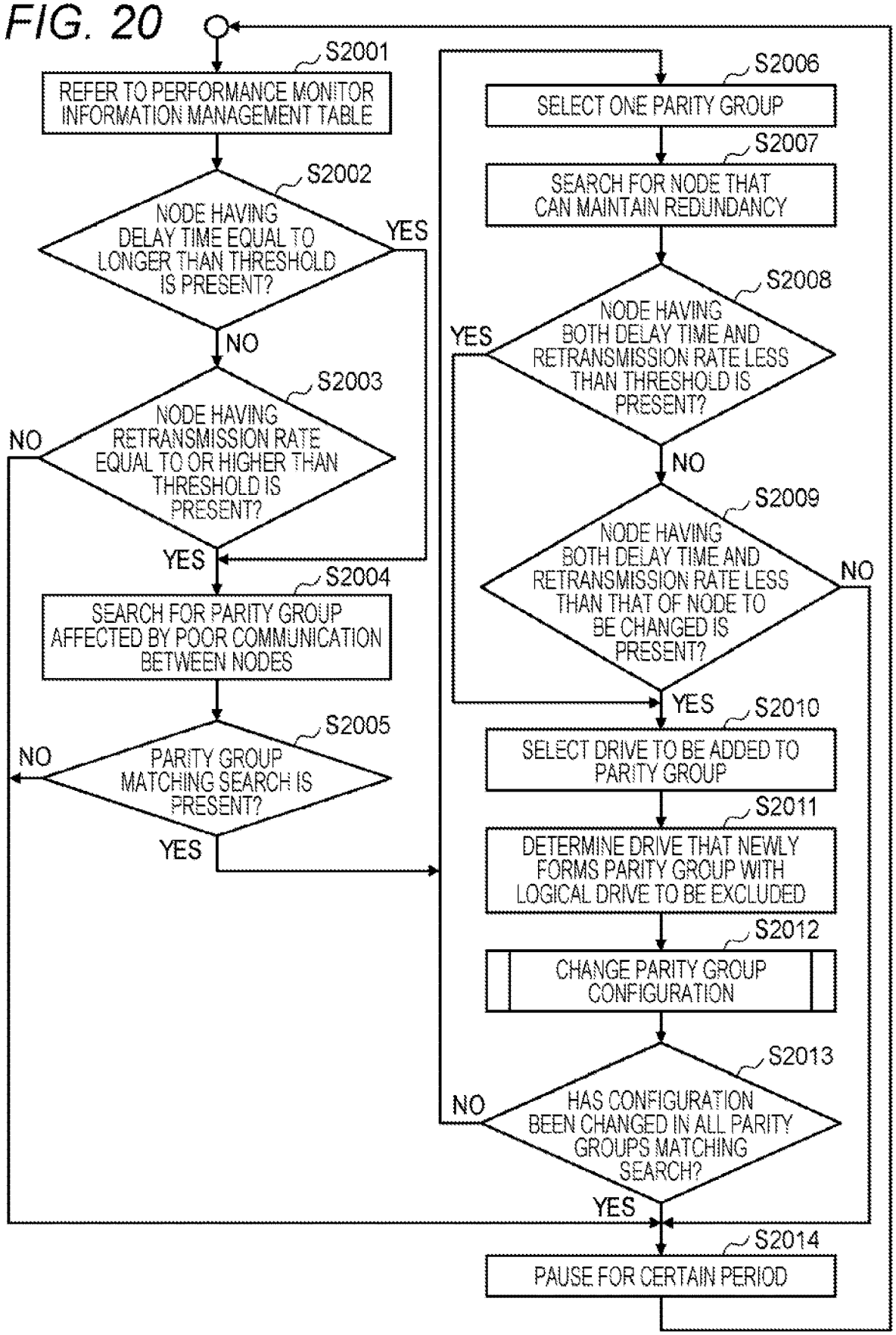
FIG. 20 is a diagram illustrating an example of a flowchart related to performance monitor-based redundancy destination switching processing according to the first embodiment.

FIG. 20 is a diagram illustrating an example of a flowchart related to the performance monitor-based redundancy destination switching process. The performance monitor-based redundancy destination switching program 331 refers to the information of the inter-node network quality information table 950 on the performance monitor information management table 316, and reassembles the parity group 212 configured by the logical drives 211 between two nodes having a long delay time or a high retransmission rate to a redundant configuration with another node. The performance monitor-based redundancy destination switching program 331 is executed for each node. Details will be described below.

In step S2001, the performance monitor-based redundancy destination switching program 331 refers to the inter-node network quality information table 950 of the execution target node 120 (hereinafter, the node) and acquires the delay time and the retransmission rate of each other node 120 and the inter-node network.

In step S2002, the performance monitor-based redundancy destination switching program 331 determines whether there is a node 120 having a delay time equal to or longer than the threshold among the delay time information of each node acquired in step S2001. In a case where it is determined that there is a node 120 with a delay time equal to or longer than the threshold, the processing proceeds to step S2004. In a case where it is determined that there is no node 120 with a delay time equal to or longer than the threshold, the processing proceeds to step S2003.

In step S2003, the performance monitor-based redundancy destination switching program 331 determines whether there is a node 120 having a retransmission rate equal to or higher than a threshold among the retransmission rate information of each node acquired in step S2001. In a case where it is determined that there is a node 120 having a retransmission rate equal to or higher than the threshold, the processing proceeds to step S2004. When it is determined that there is no node 120 having a retransmission rate equal to or higher than the threshold, the process proceeds to step S2014.

In step S2004, the performance monitor-based redundancy destination switching program 331 searches the node for the parity group 212 including the logical drive 211 of the node and the logical drive 211 (hereinafter, excluded logical drive) of a node 120 detected in step S2002 or the node 120 (hereinafter, excluded nodes) detected in step S2003. Although the delay time of the inter-node network or the retransmission rate of the inter-node network is used as an example of the criterion for selecting the excluded node, the excluded node may be selected on the basis of other performance information or the like.

In step S2005, the performance monitor-based redundancy destination switching program 331 determines whether there is a parity group 212 matching the search in step S2004. In a case where it is determined that there is the parity group 212 matching the search, the processing proceeds to step S2006. In a case where it is determined that there is no parity group 212 matching the search, the processing proceeds to step S2014.

In step S2006, the performance monitor-based redundancy destination switching program 331 selects one parity group 212 from the parity groups 212 matching the search in step S2005.

In step S2007, the performance monitor-based redundancy destination switching program 331 searches for the node 120 that can maintain the redundancy of the configuration change target parity group by adding the logical drive 211 of a node 120 even after excluding the excluded logical drive from the parity group 212 (hereinafter, the configuration change target parity group) selected in step S2006. The node 120 is determined on the basis of the reliability policy of the virtual volume 215 stored on the logical drive 211 of the node constituting the configuration change target parity group.

In step S2008, the performance monitor-based redundancy destination switching program 331 refers to the inter-node network quality information table 950 and determines whether there is a node 120 whose delay time with the node and retransmission rate are both less than the threshold among the nodes selected in step S2007. When it is determined that there is a node 120 whose delay time and retransmission rate with the node are both less than the threshold, the process proceeds to step S2010. When it is determined that there is no node 120 whose delay time and retransmission rate with the node are both less than the threshold, the process proceeds to step S2009.

In step S2009, the performance monitor-based redundancy destination switching program 331 refers to the inter-node network quality information table 950 and determines whether there is a node 120 whose delay time and retransmission rate with the node are less than the delay time and less than the retransmission rate between the node to be excluded and the node among the nodes selected in step S2007. In a case where it is determined that the corresponding node 120 exists, the processing proceeds to step S2010. In a case where it is determined that the corresponding node 120 does not exist, the processing proceeds to step S2014.

In step S2010, the performance monitor-based redundancy destination switching program 331 selects one of the nodes 120 detected in step S2008 or the node 120 detected in step S2009. Further, the logical drive 211 (hereinafter, the additional logical drive) to be added to the configuration change target parity group is selected from the logical drives 211 included in the selected node 120. Note that the delay time of the inter-node network or the retransmission rate of the inter-node network is used as an example of the criterion for selection of the additional logical drive, but the additional logical drive may be selected on the basis of other performance information or the like.

In step S2011, after excluding the excluded logical drive from the configuration change target parity group, the performance monitor-based redundancy destination switching program 331 determines the logical drive 211 that newly assembles the parity group with the excluded logical drive in order to make the data of the excluded logical drive redundant again. The logical drive 211 in which the excluded logical drive newly forms the parity group and the redundancy scheme are determined based on the reliability policy of the virtual volume 215 stored in the excluded logical drive 211.

In step S2012, the performance monitor-based redundancy destination switching program 331 executes the parity group configuration change program 329 to change the configuration of the configuration change target parity group. At this time, the number of the configuration change target parity group, the number of the additional logical drive determined in step S2010, the excluded logical drive, the list of the numbers of the logical drives 211 newly combining the parity group with the excluded logical drive determined in step S2011, and the redundancy scheme of the parity group newly combined by the excluded logical drive are used as arguments of the parity group configuration change program 329.

In step S2013, the performance monitor-based redundancy destination switching program 331 determines whether the configuration change has been performed in all the parity groups 212 detected in step S2005. When it is determined that the configuration change has been performed for all the parity groups 212 detected in step S2005, the process proceeds to step S2014. In a case where it is determined that there is the parity group 212 for which the configuration change has not been performed among the parity groups detected in step S2005, the processing proceeds to step S2006, and the configuration change proceeds to the next parity group 212.

In step S2014, the performance monitor-based redundancy destination switching program 331 is paused for a certain period. When the pause period ends, the process returns to step S2001 again to proceed with the processing.

Figure 21A:
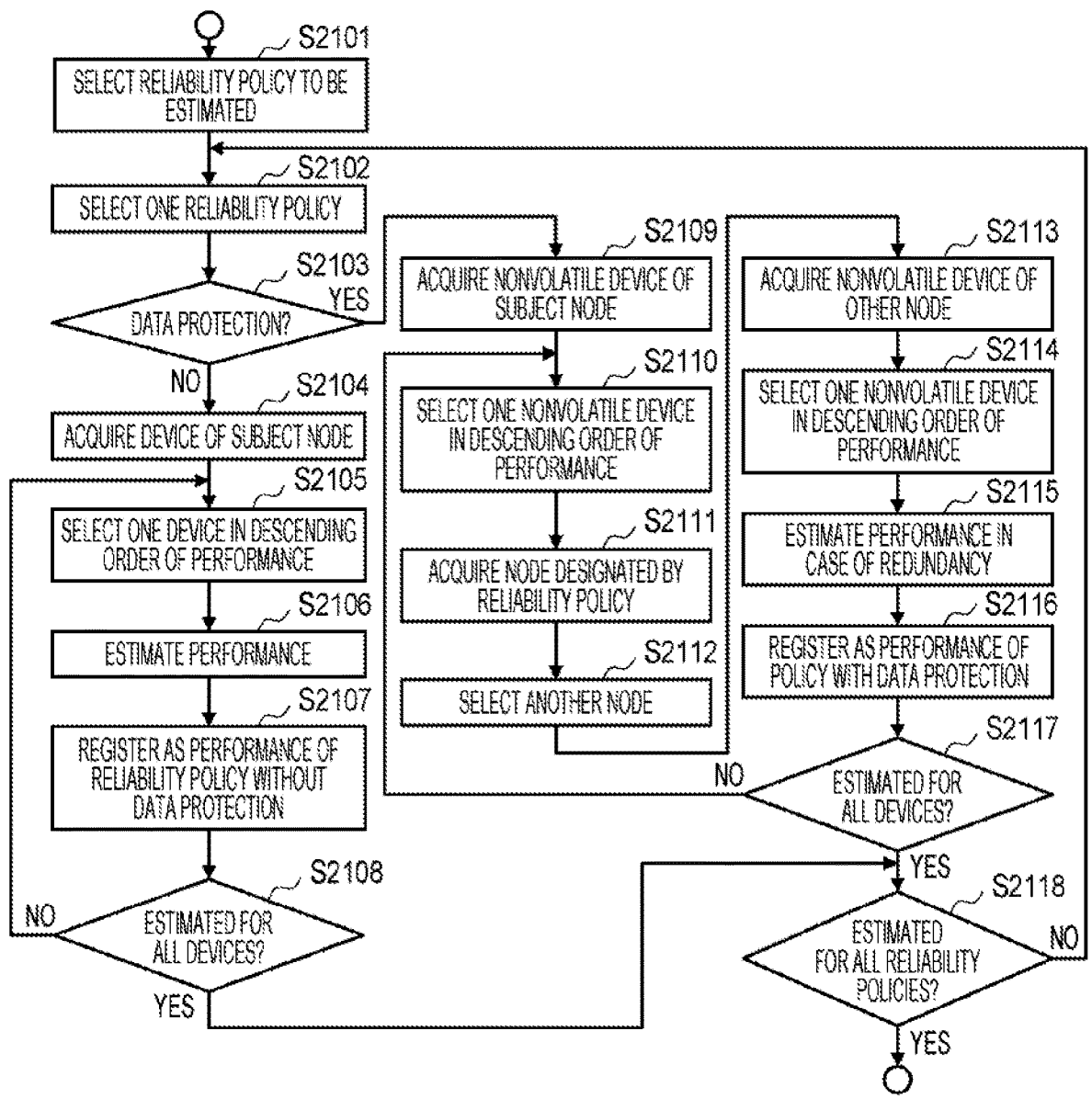
FIG. 21A is a diagram illustrating an example of a performance estimate processing unit of a flowchart related to performance index-based policy determination processing according to the first embodiment.
Figure 21B:
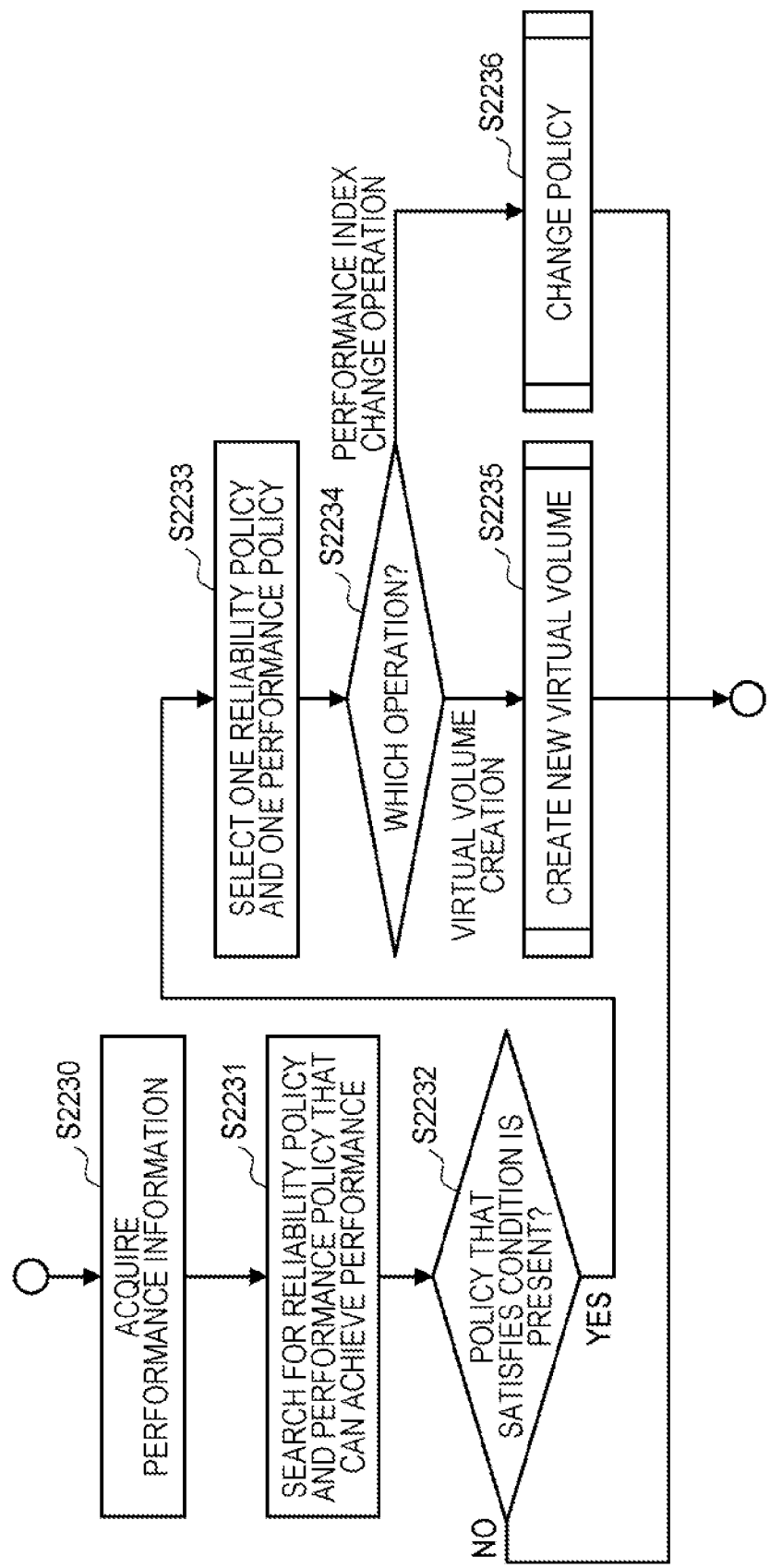
FIG. 21B is a diagram illustrating an example of a policy determination unit of a flowchart related to performance index-based policy determination processing according to the first embodiment.

FIG. 21 is a diagram illustrating an example of a flowchart related to performance index-based policy determination processing. The performance index-based policy determination processing program 332 determines the reliability policy and the performance policy of the virtual volume 215 from the performance index input at the time of the virtual volume creation operation by the user of the storage system 100 or the performance index input at the time of the performance index change operation of the virtual volume. The performance index-based policy determination processing program 332 includes a performance estimation processing unit that estimates the performance of the reliability policy and the performance policy in advance illustrated in FIG. 21A, and a policy determination unit that selects the reliability policy and the performance policy from the input performance indexes illustrated in FIG. 21B.

Details of the performance estimation processing unit illustrated in FIG. 21A will be described below. The performance estimate processing unit is executed for all the nodes 120 constituting the storage system 100. The performance estimation processing unit estimates the performance when the virtual volume 215 to which a certain reliability policy and performance policy are applied is created in the target node.

In step S2101, the performance index-based policy determination processing program 332 determines a reliability policy to be estimated. The set of policies may be all the reliability policies selectable in the storage system 100, or may be only a part (for example, "no failure resistance", "node failure resistant, dual","availability zone failure resistance, dual", and the like).

In step S2102, the performance index-based policy determination processing program 332 selects one reliability policy for which performance has not been estimated from among the reliability policies (hereinafter, the reliability policy) selected in step S2101.

In step S2103, the performance index-based policy determination processing program 332 determines whether the reliability policy is a reliability policy for performing data protection. When it is determined that the reliability policy is the reliability policy that performs data protection, the processing proceeds to step S2109. When it is determined that the reliability policy is the reliability policy in which the data protection is not performed, the processing proceeds to step S2104.

In step S2104, the performance index-based policy determination processing program 332 refers to the node configuration table 420, the drive configuration management table 430, and the cache device configuration management table 440 of the cluster configuration management table 311, and acquires devices (drive 124, memory 122 (DRAM, SCM, and the like)) that can be used as response storage devices in the node and performance information (High, Middle, Low, and the like) indicating the respective performances.

In step S2105, the performance index-based policy determination processing program 332 selects a device that is not yet an estimation target from the devices acquired in step S2104. At this time, the devices are selected in descending order of performance.

In step S2106, the performance index-based policy determination processing program 332 estimates the performance of the virtual volume 215 using the device selected in step S2105 as the response storage device. The estimation method may be a method of estimating the performance from the performance monitor result separately executed by the storage program 200 with respect to the virtual volume 215 to which the reliability policy and the response storage device are actually applied. Alternatively, a method of holding the performance when the performance index-based policy determination processing program 332 uses the reliability policy and the response storage device as a fixed value in advance and setting the performance as the estimation performance, or another method may be used. The performance estimated here is, for example, the number of IO processing commands per second and the response time, but is not limited to the number of 10 processing commands and the response time.

In step S2107, the performance index-based policy determination processing program 332 adds a record to the policy performance information table 2330 of the policy performance information management table 317, assigns and describes a policy ID, describes the node number, and describes the performance estimated in step S2106 as the estimated performance when the performance policy in the reliability policy is the performance information of the response storage device selected in step S2105 (for example, when the response storage device is a DRAM whose performance information is "High", the performance policy is "High").

In step S2108, the performance index-based policy determination processing program 332 determines whether the performance has been estimated for all the devices acquired in step S2104. In a case where it is determined that the performance has been estimated for all the acquired devices, the processing proceeds to step S2118. In a case where it is determined that there is a device whose performance has not been estimated among the acquired devices, the processing proceeds to step S2105, and the performance of the next device is estimated.

In step S2109, the performance index-based policy determination processing program 332 refers to the node configuration table 420, the drive configuration management table 430, and the cache device configuration management table 440 of the cluster configuration management table 311, and acquires the nonvolatile devices (drive 124, memory 122 (SCM, and the like)) that can be used as the response storage devices in the node and the performance information (Middle, Low, and the like) indicating the performance of each of the nonvolatile devices.

In step S2110, the performance index-based policy determination processing program 332 selects a device that is not yet an estimation target from the devices acquired in step S2109. At this time, the devices are selected in descending order of performance.

In step S2111, the performance index-based policy determination processing program 332 acquires the node 120 satisfying the reliability policy as the data redundancy destination node.

In step S2112, the performance index-based policy determination processing program 332 selects one or more nodes to be made redundant from the nodes 120 acquired in step S2111. The method of selecting a node may be a method of referring to the inter-node network quality information table 950 of the performance monitor management table 316 and selecting a node 120 having good network quality with the node, or may be another method.

In step S2113, the performance index-based policy determination processing program 332 refers to the node configuration table 420, the drive configuration management table 430, and the cache device configuration management table 440 of the cluster configuration management table 311, and acquires a nonvolatile device (drive 124, memory 122 (SCM, and the like)) that can be used as a response storage device in the node 120 selected in step S2112 and performance information (Middle, Low, and the like) indicating each performance.

In step S2114, the performance index-based policy determination processing program 332 selects a device that is not yet an estimation target from the devices acquired in step S2113. At this time, the devices are selected in descending order of performance.

In step S2115, the performance index-based policy determination processing program 332 estimates the performance of the virtual volume 215 in which the node is set as the primary node, the device selected in step S2110 is set as the response storage device of the primary node, the node 120 selected in step S2112 is set as the redundancy destination node, and the device selected in step S2114 is set as the response storage device of the redundancy destination node. The estimation method may be a method of estimating the performance from the performance monitor result separately executed by the storage program 200 with respect to the virtual volume 215 to which the reliability policy and the response storage device are actually applied. Alternatively, a method of holding the performance when the performance index-based policy determination processing program 332 uses the reliability policy and the response storage device as a fixed value in advance and setting the performance as the estimation performance, or another method may be used. The performance estimated here is, for example, the number of 10 processing commands per second and the response time, but is not limited to the number of IC processing commands and the response time.

In step S2116, the performance index-based policy determination processing program 332 adds a record to the policy performance information table 2330 of the policy performance information management table 317, assigns and describes a policy ID, describes the node number, and describes the performance estimated in step S2115 as the estimated performance when the performance policy is the performance information of the response storage device selected in step S2110 (for example, when the response storage device is an SCM whose performance information is "Middle", the performance policy is "Middle") in the reliability policy.

In step S2117, the performance index-based policy determination processing program 332 determines whether the performance has been estimated for all the devices acquired in step S2109. In a case where it is determined that the performance has been estimated for all the acquired devices, the processing proceeds to step S2118. In a case where it is determined that there is a device whose performance has not been estimated among the acquired devices, the processing proceeds to step S2110, and the performance of the next device is estimated.

In step S2118, the performance index-based policy determination processing program 332 determines whether the performance has been estimated for all the reliability policies selected in step S2101. When it is determined that the performance is estimated with all the selected reliability policies, the program is terminated. When it is determined that there is a reliability policy whose performance has not been estimated among all the selected reliability policies, the processing proceeds to step S2102, and the performance in the next reliability policy is estimated.

Hereinafter, details of the policy determination unit illustrated in FIG. 21B will be described. In step 32230, the performance index-based policy determination processing program 332 acquires the performance index input by the user of the storage system 100.

In step S2231 the performance index-based policy determination processing program 332 refers to the policy performance information table 2330 of the policy performance information management table 317, and searches for a set of the reliability policy and the performance policy satisfying the performance index acquired in step 32230.

In step S2232, the performance index-based policy determination processing program 332 determines whether there is a set of the reliability policy and the performance policy satisfying the performance index from the result of step S2231. When it is determined that there is a set of the reliability policy and the performance policy satisfying the performance index, the processing proceeds to step S2233. When it is determined that there is no set of the reliability policy and the performance policy satisfying the performance index, the program is terminated after notifying the user that there is no set of the reliability policy and the performance policy satisfying the performance index.

In step S2233, the performance index-based policy determination processing program 332 selects only one set from the set of the reliability policy and the performance policy satisfying the performance index. The selection method may be a method in which all sets of policies satisfying the performance index are presented to the user of the storage system 100 and one set is selected therefrom. Alternatively, a method in which the program selects a set of policies having the highest performance, or another method may be used.

In step S2234, the performance index-based policy determination processing program 332 determines what operation has called the processing of the policy determination unit. When it is determined that the operation is the virtual volume creation operation, the processing proceeds to step S2235. When it is determined that the operation is the performance index change processing of the virtual volume, the processing proceeds to step S2236.

In step S2235, the performance index-based policy determination processing program 332 executes the redundancy destination node/response storage device determination program 326 using the node associated with the set of the reliability policy, the performance policy, and the policy selected in step S2233 as an argument, and creates the virtual volume 215.

In step S2236, the performance index-based policy determination processing program 332 executes the redundancy destination node/response storage device change program 327 using the reliability policy and the performance policy selected in step S2233 as arguments, and changes both policies of the virtual volume.

FIG. 22 is a diagram illustrating an example of the policy performance information management table. The policy performance information management table 317 manages the performance estimate information when the reliability policy and the performance policy are applied to the virtual volume. The policy performance information management table 317 includes a policy performance information table 2330.

The policy performance information table 2330 manages performance estimation information when a set of a reliability policy and a performance policy is applied to a virtual volume in each node. More specifically, the policy performance information table 2330 manages a policy number 2331, a node number 2332, a reliability policy 2233, a performance policy 2334, the number of IO processing commands 2335, and a response time 2336 in association with each other.

The policy number 2331 is identification information that can identify a set of policies. The node number 2332 is identification information that can identify the node 120 that has estimated the performance of the policy. The reliability policy 2333 is information indicating the reliability policy set in the estimation. The performance policy 2334 is information indicating the performance policy set in the estimation. The number of 10 processing commands 2335 is information indicating the estimated number of 10 processing commands per second in the virtual volume to which the policy of the node is applied, and the unit is, for example, KIOPS (Kilo Input Output Per Second). The response time 2336 is information indicating the estimated response time of the node in the virtual volume to which the policy is applied, and the unit is, for example, ms (milliseconds).

Note that the performance information described in the policy performance information table 2330 is, for example, the number of IO processing commands per second and the response time, but is not limited to the number of 10 processing commands and the response time.

The present invention is not limited to the above-described embodiment, and includes various modifications. For example, the above-described embodiments have been described in detail for easy understanding of the present invention, and are not necessarily limited to those having all the described configurations. Further, a part of the configuration of one embodiment can be replaced with the configuration of another embodiment, and the configuration of another embodiment can be added to the configuration of one embodiment. In addition, it is possible to add, delete, and replace other configurations for a part of the configuration of each embodiment.

What is claimed is:

1. A data processing method of a storage system including a plurality of nodes connected to each other via a network, and a storage device, each of the plurality of nodes including a processor that processes data input to and output from the storage device, and a memory, the data processing method allowing the processor to:
provide a volume to be accessed by a host;
set a reliability policy related to data reliability and a performance policy related to response performance to an access to the volume in the volume;
determine a node that processes redundant data of data for a node that processes the data related to the volume based on the reliability policy;
determine, for each node based on the performance policy, a memory or storage device to store the data or the redundant data to return a result of the access to the volume;
return a response to the host when data of the write request from the host is stored in a memory or a storage device determined based on the performance policy of a node that processes the data, and the redundant data is stored in the memory or the storage device determined based on the performance policy of the node that processes the redundant data;
change the reliability policy and/or the performance policy while an access from the host to the volume occurs;
change necessity of redundancy of the data, a target node of the redundancy of the data, and a storage device of a data storage destination based on the reliability policy and the performance policy; and
return a response to the host when the data is stored in the changed storage device.

2. A storage system comprising:
a plurality of nodes connected to each other via a network, and a storage device, each of the plurality of nodes including a processor that processes data input to and output from the storage device, and a memory, wherein
the processor is configured to:
provide a volume to be accessed by a host;
set a reliability policy related to data reliability and a performance policy related to response performance to an access to the volume in the volume;
determine a node that processes redundant data of data for a node that processes the data related to the volume based on the reliability policy;
determine, for each node based on the performance policy, a memory or storage device to store the data or the redundant data to return a result of the access to the volume;
return a response to the host when data of the write request from the host is stored in a memory or a storage device determined based on the performance policy of a node that processes the data, and the redundant data is stored in the memory or the storage device determined based on the performance policy of the node that processes the redundant data;

change the reliability policy and/or the performance policy while an access from the host to the volume occurs;

change necessity of redundancy of the data, a target node of the redundancy of the data, and a storage device of a data storage destination based on the reliability policy and the performance policy; and return a response to the host when the data is stored in the changed storage device.

3. The storage system according to claim 2, wherein the processor is configured to:

determine, based on the performance policy, different memories or storage devices for a node that processes the data and a node that processes the redundant data.

4. The storage system according to claim 3, wherein the processor is configured to:

after data is stored in a memory and a response is returned to the host at the node determined, move the data from the memory to the storage device.

5. The storage system according to claim 3, wherein the processor is configured to:

when the reliability policy does not require redundancy of data applied to the volume, store the data in the memory and return a response to the access to the host.

6. The storage system according to claim 3, wherein the processor is configured to:

when the reliability policy requires redundancy of the data, execute a response to the host for the access for each of two or more nodes among the plurality of nodes based on storage of data in different types of storage devices among the plurality of storage devices.

7. The storage system according to claim 3, wherein the processor is configured to:

when the reliability policy requires redundancy of the data, execute a response to the host for the access for each of two or more nodes among the plurality of nodes based on storage of the data in a storage device equal in type to each other.

8. The storage system according to claim 2, comprising:

a plurality of availability zones, each of the plurality of availability zones including a plurality of the nodes, wherein the processor determines whether to store the data and the redundant data in a plurality of nodes belonging to an availability zone equal to each other or across a plurality of nodes belonging to a plurality of availability zones based on the reliability policy.

9. The storage system according to claim 8, wherein the processor is configured to:

select a low-load node among the plurality of nodes as a node for storing the redundant data.

10. The storage system according to claim 2, wherein the processor is configured to:

determine a node that stores redundant data of the data based on a communication state of the network.

11. The storage system according to claim 2, wherein the processor is configured to use duplicated data of the data as the redundant data of the data applied to the volume.

12. The storage system according to claim 2, wherein the processor is configured to determine the reliability policy and the performance policy so as to satisfy a performance index value set by a user.

* * * * *